United States Patent
Zhou et al.

(10) Patent No.: US 10,136,132 B2
(45) Date of Patent: Nov. 20, 2018

(54) ADAPTIVE SKIP OR ZERO BLOCK DETECTION COMBINED WITH TRANSFORM SIZE DECISION

(71) Applicant: Microsoft Technology Licensing, LLC, Redmond, WA (US)

(72) Inventors: You Zhou, Sammamish, WA (US); Sergey Sablin, Stockholm (SE); Chih-Lung Lin, Redmond, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 14/805,246

(22) Filed: Jul. 21, 2015

(65) Prior Publication Data

US 2017/0026645 A1    Jan. 26, 2017

(51) Int. Cl.
| | |
|---|---|
| H04N 19/124 | (2014.01) |
| H04N 19/172 | (2014.01) |
| H04N 19/64 | (2014.01) |
| H04N 19/176 | (2014.01) |
| H04N 19/122 | (2014.01) |
| H04N 19/132 | (2014.01) |
| H04N 19/136 | (2014.01) |

(52) U.S. Cl.
CPC ......... *H04N 19/124* (2014.11); *H04N 19/122* (2014.11); *H04N 19/132* (2014.11);
(Continued)

(58) Field of Classification Search
None
See application file for complete search history.

(56) References Cited

U.S. PATENT DOCUMENTS

| | | |
|---|---|---|
| 6,753,878 B1 | 6/2004 | Heirich et al. |
| 6,763,068 B2 | 7/2004 | Oktem |

(Continued)

FOREIGN PATENT DOCUMENTS

| | | |
|---|---|---|
| CN | 1694533 | 11/2005 |
| CN | 102055977 | 5/2011 |

(Continued)

OTHER PUBLICATIONS

Al et al., "Quality and Complexity Comparison of H.264 Intra Mode with JPEG2000 and JPEG," *IEEE Int'l Conf. on Image Processing*, vol. 1, pp. 525-528 (Oct. 2004).

(Continued)

*Primary Examiner* — Mohammad J Rahman
(74) *Attorney, Agent, or Firm* — Klarquist Sparkman, LLP

(57) ABSTRACT

Disclosed herein are exemplary embodiments of innovations in the area of encoding pictures or portions of pictures and determining whether and how certain encoding operations should be performed and flagged for performance by the decoder in the bitstream. In particular examples, various implementations for selectively encoding picture portions (e.g., blocks) in a skip mode (e.g., as in the skip mode of the H.265/HEVC standard) are disclosed. Embodiments of the disclosed techniques can be used to improve encoder efficiency, decrease overall encoder resource usage, and/or improve encoder speed. Such embodiments can be used in encoder modes in which efficient, fast encoder performance is desired (e.g., during encoding of live events, such as video conferencing).

19 Claims, 10 Drawing Sheets

(52) U.S. Cl.
CPC ......... *H04N 19/136* (2014.11); *H04N 19/172* (2014.11); *H04N 19/176* (2014.11); *H04N 19/64* (2014.11)

(56) References Cited

U.S. PATENT DOCUMENTS

| | | |
|---|---|---|
| 7,260,148 B2 | 8/2007 | Sohm |
| 7,580,456 B2 | 8/2009 | Li et al. |
| 7,733,380 B1 | 6/2010 | Cote et al. |
| 7,764,738 B2 | 7/2010 | Kim et al. |
| 7,843,995 B2 | 11/2010 | Bhaskaran et al. |
| 7,903,733 B2 | 3/2011 | Panda et al. |
| 8,254,455 B2 | 8/2012 | Wu et al. |
| 8,270,467 B1 | 9/2012 | Wang |
| 8,295,356 B2 | 10/2012 | He et al. |
| 8,331,449 B2 | 12/2012 | Kim et al. |
| 8,335,255 B2 | 12/2012 | Lee et al. |
| 8,379,728 B2 | 2/2013 | Katzur et al. |
| 8,379,996 B2 | 2/2013 | Murata et al. |
| 8,428,373 B2 | 4/2013 | Jeon et al. |
| 8,457,202 B2 | 6/2013 | Wang et al. |
| 8,467,448 B2 | 6/2013 | Hsiang et al. |
| 8,514,933 B2 | 8/2013 | Liang et al. |
| 8,693,551 B2 | 4/2014 | Zheludkov et al. |
| 8,737,477 B2 | 5/2014 | La et al. |
| 8,743,949 B2 * | 6/2014 | Srinivasan ............ H04N 19/136 375/240 |
| 8,804,836 B2 | 8/2014 | Nilsson et al. |
| 9,137,544 B2 | 9/2015 | Lin et al. |
| 9,219,915 B1 * | 12/2015 | Bultje .................... H04N 19/60 |
| 2002/0025001 A1 | 2/2002 | Ismaeil et al. |
| 2003/0156648 A1 * | 8/2003 | Holcomb ............ H04N 19/136 375/240.18 |
| 2004/0264575 A1 | 12/2004 | Bjontegaard |
| 2005/0069211 A1 | 3/2005 | Lee et al. |
| 2005/0084012 A1 * | 4/2005 | Hsu ........................ H04N 19/52 375/240.12 |
| 2005/0207497 A1 | 9/2005 | Rovati et al. |
| 2006/0098738 A1 | 5/2006 | Cosman et al. |
| 2006/0164543 A1 | 7/2006 | Richardson et al. |
| 2007/0030894 A1 | 2/2007 | Tian et al. |
| 2007/0031051 A1 | 2/2007 | Lee et al. |
| 2007/0036215 A1 | 2/2007 | Pan et al. |
| 2007/0140344 A1 | 6/2007 | Shima |
| 2007/0177668 A1 | 8/2007 | Park |
| 2007/0263720 A1 | 11/2007 | He |
| 2007/0274396 A1 | 11/2007 | Zhang et al. |
| 2008/0279466 A1 | 11/2008 | Yang |
| 2009/0073005 A1 | 3/2009 | Normile et al. |
| 2009/0129472 A1 | 5/2009 | Panusopone et al. |
| 2009/0190660 A1 | 7/2009 | Kusakabe et al. |
| 2009/0245353 A1 | 10/2009 | Choi et al. |
| 2009/0290641 A1 | 11/2009 | Crinon et al. |
| 2010/0020872 A1 | 1/2010 | Shmizu et al. |
| 2010/0061447 A1 | 3/2010 | Tu et al. |
| 2010/0074338 A1 | 3/2010 | Yamori |
| 2010/0150253 A1 | 6/2010 | Kuo et al. |
| 2010/0189179 A1 | 7/2010 | Gu et al. |
| 2010/0215104 A1 | 8/2010 | Osamoto et al. |
| 2010/0246684 A1 | 9/2010 | Naito et al. |
| 2010/0260271 A1 | 10/2010 | Kapoor |
| 2010/0290521 A1 | 11/2010 | Liu et al. |
| 2011/0013700 A1 | 1/2011 | Kim |
| 2011/0051813 A1 | 3/2011 | Krishnan et al. |
| 2011/0109753 A1 | 5/2011 | Srinivasamurthy et al. |
| 2011/0142134 A1 | 6/2011 | Wahadaniah |
| 2011/0164677 A1 | 7/2011 | Lu et al. |
| 2011/0200264 A1 | 8/2011 | Park |
| 2011/0243225 A1 | 10/2011 | Min et al. |
| 2011/0261888 A1 * | 10/2011 | Cammas ............ H04N 19/176 375/240.24 |
| 2011/0268187 A1 | 11/2011 | Lamy-Bergot et al. |
| 2011/0274357 A1 | 11/2011 | Iwamoto et al. |
| 2011/0286520 A1 | 11/2011 | Xu et al. |
| 2011/0292998 A1 | 12/2011 | Ohgose et al. |
| 2012/0195366 A1 | 8/2012 | Liu et al. |
| 2012/0200663 A1 | 8/2012 | Sievers et al. |
| 2012/0281760 A1 | 11/2012 | Kim |
| 2013/0003838 A1 | 1/2013 | Gao et al. |
| 2013/0003860 A1 | 1/2013 | Sasai et al. |
| 2013/0016777 A1 | 1/2013 | Gao et al. |
| 2013/0021483 A1 | 1/2013 | Bennett et al. |
| 2013/0028317 A1 | 1/2013 | Parfenov et al. |
| 2013/0089143 A1 | 4/2013 | Siddaramanna et al. |
| 2013/0114696 A1 | 5/2013 | Liu |
| 2013/0114730 A1 | 5/2013 | Joshi et al. |
| 2013/0121401 A1 | 5/2013 | Zheludkov et al. |
| 2013/0128952 A1 * | 5/2013 | Kwon ................... H04N 19/172 375/240.02 |
| 2013/0128964 A1 | 5/2013 | Chien et al. |
| 2013/0216149 A1 * | 8/2013 | Sato ...................... H04N 19/115 382/233 |
| 2013/0230098 A1 * | 9/2013 | Song .................... H04N 19/463 375/240.03 |
| 2013/0272389 A1 * | 10/2013 | Sze ........................ H04N 19/91 375/240.03 |
| 2013/0308696 A1 * | 11/2013 | Kim ....................... H04N 19/80 375/240.02 |
| 2013/0343462 A1 | 12/2013 | Li et al. |
| 2013/0343464 A1 | 12/2013 | Van der Auwera et al. |
| 2014/0064359 A1 | 3/2014 | Rapaka et al. |
| 2014/0079133 A1 | 3/2014 | Sato |
| 2014/0219331 A1 | 8/2014 | Pai et al. |
| 2014/0219342 A1 | 8/2014 | Yu et al. |
| 2014/0219349 A1 | 8/2014 | Chien et al. |
| 2014/0226713 A1 | 8/2014 | Perlman et al. |
| 2014/0229186 A1 * | 8/2014 | Mehrotra .............. G10L 19/032 704/500 |
| 2014/0241420 A1 | 8/2014 | Orton-Jay et al. |
| 2014/0254676 A1 | 9/2014 | Jiang et al. |
| 2014/0269919 A1 | 9/2014 | Rodriguez |
| 2014/0301465 A1 | 10/2014 | Kwon et al. |
| 2014/0369413 A1 | 12/2014 | Clark |
| 2015/0098500 A1 | 4/2015 | Oh et al. |
| 2015/0189269 A1 * | 7/2015 | Han ...................... H04N 19/176 375/240.12 |
| 2015/0271510 A1 | 9/2015 | Wen et al. |
| 2016/0094855 A1 | 3/2016 | Zhou |

FOREIGN PATENT DOCUMENTS

| | | | |
|---|---|---|---|
| CN | 102148989 | 8/2011 | |
| CN | 102665078 | 9/2012 | |
| CN | 103118262 | 5/2013 | |
| CN | 103248895 | 8/2013 | |
| CN | 103281538 | 9/2013 | |
| CN | 103384327 | 11/2013 | |
| CN | 103533325 | 1/2014 | |
| CN | 103763570 | 4/2014 | |
| EP | 1369820 | 12/2003 | |
| EP | 1603338 | 12/2005 | |
| EP | 1761069 | 3/2007 | |
| EP | 2618572 | 7/2013 | |
| JP | 2003-244696 | 8/2003 | |
| WO | WO 2004/080084 | 9/2004 | |
| WO | WO 2007/025809 A2 * | 3/2007 | ........... H04N 19/176 |
| WO | WO 2012/071949 | 6/2012 | |
| WO | WO 2013/028580 | 2/2013 | |
| WO | WO 2013/143103 | 10/2013 | |
| WO | WO 2013/181821 | 12/2013 | |
| WO | WO 2014/083491 | 6/2014 | |

OTHER PUBLICATIONS

Armbrust, "Capturing Growth: Photo Apps and Open Graph," 8 pp., downloaded from https://developer.facebook.com/blog/post/2012/07/17/capturing-growth--photo-apps-and-open-graph/ (Jul. 17, 2012).
BenHajyoussef et al., "Fast Gradient Based Intra Mode Decision for High Efficiency Video Coding," *Int'l Journal of Emerging Trends& Technology in Computer Science*, vol. 3, Issue 3, pp. 223-228 (May 2014).

(56) References Cited

OTHER PUBLICATIONS

Bjontegaard, "Calculation of Average PSNR Differences Between RD-curves," ITU-T VCEG-M33, 4 pp. (Apr. 2001).
Bross et al., "High Efficiency Video Coding (HEVC) Text Specification draft 8," JCTVC-J1003_d7, 260 pp. (Jul. 2012).
Chang et al., "A Two Level Mode Decision Algorithm for H.264 High Profile Intra Encoding," IEEE Int'l Symp. on Circuits and Systems, pp. 508-511 (May 2012).
Ding et al., "Enable Efficient Compound Image Compression in H.264/AVC Intra Coding," IEEE Int'l Conf. on Image Processing, vol. 2, pp. 337-340 (Sep. 2007).
Do et al., "An Early Block Type Decision Method for Intra Prediction in H.264/AVC," IEEE Workshop on Signal Processing Systems, pp. 97-101 (Oct. 2009).
Flynn et al., "High Efficiency Video Coding (HEVC) Range Extensions text specification: Draft 6," JCTVC-P1005_v1, 355 pp. (Jan. 2014).
Fritts et al., "Fast Intra-Prediction Mode Selection for H.264," Powerpoint, presentation, downloaded from the World Wide Web, 23 pp. (downloaded on Apr. 17, 2015—document not dated).
Gabriellini et al., "Adaptive Transform Skipping for Improved Coding of Motion Compensated Residuals," BBC Research & Development White Paper, WHP 246, 22 pp. (Mar. 2013).
Gan et al., "Novel multi-frame fast motion search algorithm based on H.264," Journal on Communications, vol. 28, No. 1, pp. 17-21 (Jan. 2007).
"How VP9 works, technical details & diagrams," downloaded from the World Wide Web, 12 pp. (document marked Oct. 2013).
Hsu et al., "Fast Coding Unit Decision Algorithm for HEVC," Signal and Information Processing Association Annual Summit and Conf., 5 pp. (Oct. 2013).
Hu et al., "Fast Inter-Mode Decision Based on Rate-Distortion Cost Characteristics," Proc. of the Advances in Multimedia Information Processing and 11th Pacific Rim Conf. on Multimedia, pp. 145-155 (Sep. 2010).
Jiang et al., "Gradient Based Fast Mode Decision Algorithm for Intra Prediction in HEVC," Int'l Conf on Consumer Electronics, Communications and Networks, pp. 1836-1840 (Jan. 2012).
Khan et al., "Fast Hierarchical Intra Angular Mode Selection for High Efficiency Video Coding," Proc. Int'l Conf on Image Processing, 5 pp. (Oct. 2014).
Kim et al., "A Fast Intra Mode Skip Decision Algorithm Based on Adaptive Motion Vector Map," Digest of Technical Papers Int'l Conf on Consumer Electronics, 2 pp. (Jan. 2009).
Kim et al., "A Fast Intra Mode Skip Decision Algorithm Based on Adaptive Motion Vector Map," IEEE Trans. on Consumer Electronics, vol. 55, No. 1, pp. 179-184 (Feb. 2009).
Kim et al., "A Fast Intra Skip Detection Algorithm for H.264/AVC Video Encoding," ETRI Journal, vol. 28, No. 6, pp. 721-731 (Dec. 2006).
Kim et al., "An Efficient and Fast Block Size Decision Exploiting Boundary Information of Inner Block for H.264/AVC Intra Prediction," IEEE Southwest Symp. On Image Analysis and Interpretation, pp. 101-104 (Mar. 2008).
Kim et al., "Block Partitioning Structure in the HEVC Standard," IEEE Trans. On Circuits and Systems for Video Technology, vol. 22, No. 12, pp. 1697-1706 (Dec. 2012).
Kim et al., "Efficient intra-mode decision algorithm for inter-frames in H.264/AVC video coding," IET Image Processing, vol. 5, No. 3, pp. 286-295 (Apr. 2011).
Kim et al., "Fast Intra/Inter Mode Decision for H.264 Encoding Using a Risk-Minimization Criterion," SPIE Proc., Applications of Digital Image Process, vol. 5558, 11 pp. (Nov. 2004).
Kim et al., "Fast Intra Mode Decision of HEVC Based on Hierarchical Structure," Proc. 8th Int'l Conf. on Information, Communications, and Signal Processing, 4 pp. (Dec. 2011).
Kim et al., "Fast Skip Mode Decision with Rate-Distortion Optimization for High Efficiency Video Coding," IEEE Int'l Conf. on Multimedia and Expo Workshops, 6 pp. (Jul. 2014).
Kim et al., "TE9-1 Report on Performance Tests for Different CTU and TU Sizes," JCTVC-C067, 13 pp. (Oct. 2010).
Lan et al., "Compress Compound Images in H.264/MPEG-4 AVC by Exploiting Spatial Correlation," IEEE Trans. on Image Processing, vol. 19, No. 4, pp. 946-957 (Apr. 2010).
Lan et al., "Intra transform skipping," JCTVC-I0408, 11 pp. (May 2012).
Lee et al., "Early termination of transform skip mode for High Efficiency Video coding," Int'l Conf on Communications, Signal Processing and Computers, pp. 177-181 (Feb. 2014).
Lee et al., "Fast Direct Mode Decision Algorithm based on Optimal Mode Pattern Searching," Int'l Journal of Multimedia and Ubiquitous Engineering, vol. 7, No. 2, pp. 415-420 (Apr. 2012).
Lei et al., "Fast Intra Prediction Mode Decision for High Efficiency Video Coding," Int'l Symp. on Computer, Communication, Control and Automation, pp. 34-37 (Nov. 2013).
Li et al., "Description of screen content coding technology proposal by Microsoft," JCTVC-Q0035, 27 pp. (Mar. 2014).
Li et al., "Low complexity encoders for JCTVC-Q0035," JCTVC-Q0052, 4 pp. (Mar. 2014).
Liang et al., "A Light-Weight HEVC Encoder for Image Coding," Visual Communications and Image Processing, 5 pp. (Nov. 2013).
Liao et al., "Rate-Distortion Cost Estimation for H.264/AVC," IEEE Trans. on Circuits and Systems for Video Technology, vol. 20, No. 1, pp. 38-49 (Jan. 2010).
Lin et al., "Fast Mode Decision for H.264 Based on Rate-Distortion Cost Estimation," IEEE Int'l Conf. on Acoustics, Speech and Signal Processing, vol. 1, 4 pp. (Apr. 2007).
Ma et al., "Rate Distortion Cost Modeling of Skip Mode and Early Skip Mode Selection for H.264," SPIE Proc., Visual Communications and Image Processing, vol. 7257, 4 pp. (Jan. 2009).
Mrak et al., "Improving Screen Content Coding in HEVC by Transform Skipping," 20th European Signal Processing Conf., pp. 1209-1213 (Aug. 2012).
Nguyen et al., "Performance Analysis of HEVC-based Intra Coding for Still Image Compression," Picture Coding Symposium, pp. 233-236 (May 2012).
Panusopone et al., "Evaluation of RQT in HM and Related TU Representation," JCTVC-E365, 9 pp. (Mar. 2011).
Panusopone et al., "Evaluation of RQT in HM and Related TU Representation," JCTVC-E365 slideshow, 9 pp. (Mar. 2011).
Piao et al., "Encoder Improvement of Unified Intra Prediction," JCTVC-C207, 5 pp. (Oct. 2010).
Rhee et al., "A Survey of Fast Mode Decision Algorithms for Inter-Prediction and Their Applications to High Efficiency Video Coding," IEEE Trans. on Consumer Electronics, vol. 58, No. 4, pp. 1375-1383 (Nov. 2012).
Sharabayko et al., "Research on H.265/HEVC Intra Prediction Modes Selection Frequencies," Int'l Conf. for Students and Young Scientists, 3 pp. (Apr. 2014).
Shen et al., "CU Splitting Early Termination Based on Weighted SVM," EURASIP Journal on Image and Video Processing, 8 pp. (Jan. 2013).
Shen et al., "Effective CU Size Decision for HEVC Intracoding," IEEE Trans. on Image Processing, vol. 23, No. 10, pp. 4232-4241 (Oct. 2014).
Smith, "Ooh! Aah! Google Images Presents a Nicer Way to Surf the Visual Web," 4 pp., downloaded from http://googleblog.blogspot.coni/2010/07/ooh-ahh-google-images-presents-nicer.html (Jul. 20, 2010).
Tagliasacchi et al., "Hash-Based Motion Modeling in Wyner-Ziv Video Coding," IEEE Int'l Conf. on Acoustics, Speec and Signal Processing, vol. 1, pp. 509-512 (Apr. 2007).
Teng et al., "Fast Mode Decision Algorithm for Residual Quadtree Coding in HEVC," IEEE Visual Communications and Image Processing, 4 pp. (Nov. 2011).
Tian et al., "Content Adaptive Prediction Unit Size Decision Algorithm for HEVC Intra Coding," Picture Coding Symp., 4 pp. (May 2012).
U et al., "An Early Intra Mode Skipping Technique for Inter Frame Coding in H.264 BP," Digest of Technical Papers, Int'l Conf. on Consumer Electronic, 2 pp. (Jan. 2007).

(56) References Cited

OTHER PUBLICATIONS

Vanam, "Motion Estimation and Intra Frame Prediction in H.264/AVC Encoder," Powerpoint presentation, downloaded from the World Wide Web, 31 pp. (Nov. 2013).
Wang et al., "An Efficient Intra Skip Decision Algorithm for H.264/AVC Video Coding," *Journal of Applied Science and Engineering*, vol. 17, No. 3, pp. 329-339 (May 2014).
Wang et al., "An Effective TU Size Decision Method for Fast HEVC Encoders," *Int'l Symp. on Computer, Consumer and Control*, 4 pp. (Jun. 2014).
Wiegand et al., "Draft ITU-T Recommendation and Final Draft International Standard of Joint Video Specification (ITU-T Rec. H.264 | ISO/IEC 14496-10 AVC)," JVT-G050r1, 269 pp. (May 2003).
Won et al., "Transform skip based on minimum TU size," JCTVC-N0167, 10 pp. (Aug. 2013).
Yu et al., "Early Termination of Coding Unit Splitting for HEVC," *Asia-Pacific Signal & Information Processing Association Annual Summit and Conf.*, 4 pp. (Dec. 2012).
Zhang et al., "Early Termination Schemes for Fast Intra Mode Decision in High Efficiency Video Coding," *IEEE Int'l Symp. on Circuits and Systems*, pp. 45-48 (May 2013).
Zhang et al., "Fast Intra Prediction for High Efficiency Video Coding," *Proc. 13th Pacific Rim Conf. on Advances in Multimedia Information Processing*, 10 pp. (Dec. 2012).
Zhao et al., "Further Encoder Improvement of Intra Mode Decision," JCTVC-D283, 4 pp. (Jan. 2011).
Zhao et al., "Further Encoder Improvement of Intra Mode Decision," JCTVC-D283 slideshow, 14 pp. (Jan. 2011).
Chen et al., "Fast Integer Pel and Fractional Pel Motion Estimation for AVC," ISO/IEC MPEG 2002/M9117, 16 pp. (Nov. 2002).
Chen et al., "Fast Motion Estimation for JVT," JVT-G016, 12 pp. (Mar. 2003).
Deng et al., "Fast Mode Decision Algorithm for Inter-Layer Intra Prediction in SVC," *IEEE Int'l Conf. on Broadband Network and Multimedia Technology*, pp. 212-216 (Oct. 2011).
Hu et al., "Analysis and Optimization of x265 Encoder," *IEEE Visual Communications and Image Processing Conf.*, pp. 502-505 (Dec. 2014).
International Search Report and Written Opinion dated Nov. 7, 2016, from International Patent Application No. PCT/US2016/043028, 20 pp.
Kibeya et al., "A Fast Coding Algorithm Based on Fast Mode Decision for HEVC Standard," *IEEE Int'l Conf. on Sciences and Techniques of Automatic Control & Computer Engineering*, pp. 158-163 (Dec. 2013).
Lin et al., "CE6 subset 5.2.2 and 6.2.2: Intra coding improvements," JCTVC-H0057, 6 pp. (Feb. 2012).
Sun et al., "An Efficient Multi-Frame Dynamic Search Range Motion Estimation for H.264," *Visual Communications and Image Processing*, vol. 6508, 10 pp. (Jan. 2007).
Tabatabai et al., "Core Experiment 6: Intra Prediction Improvement," JCTVC-D606_r1, 13 pp. (Jan. 2011).
Zhang et al., "Improved Intra Prediction Mode-decision Method," *Visual Communications and Image Processing*, vol. 5960, pp. 632-646 (Jul. 2005).
Pan et al., "Content Adaptive Frame Skipping for Low Bit Rate Video Coding," *Int'l Conf. on Information, Communications and Signal Processing*, pp. 230-234 (Dec. 2003).
Richardson et al., "Fast H.264 Skip Mode Selection Using an Estimation Framework," *Proc. of Picture Coding Symp.*, 5 pp. (Apr. 2006).
Shen et al., "Adaptive Transform Size Decision Algorithm for High-Efficiency Video Coding Inter Coding," *Journal of Electronic Imaging*, vol. 23, Issue 4, 9 pp. (Aug. 2014).

Wang et al., "An Efficient Mode Decision Algorithm for H.264/AVC Encoding Optimization," *IEEE Trans. on Multimedia*, vol. 9, No. 4, pp. 882-888 (Jun. 2007).
Wang et al., "Prediction of Zero Quantized DCT Coefficients in H.264/AVC Using Hadamard Transformed Information," *IEEE Trans. on Circuits and Systems for Video Technology*, vol. 18, No. 4, pp. 510-515 (Apr. 2008).
Wei et al., "A Fast Macroblock Mode Decision Algorithm for H.264," *IEEE Asia Pacific Conf. on Circuits and Systems*, pp. 772-775 (Dec. 2006).
Xin et al., "Fast Inter Prediction Block Mode Decision Approach for H.264/AVC Based on All-Zero Blocks Detection," *IEEE Conf. on Industrial Electronics and Applications*, pp. 896-899 (Jun. 2013).
Kim et al., "Fast Coding Unit Size Decision Algorithm for Intra Coding in HEVC," *IEEE Int'l Conf. on Consumer Electronics*, pp. 637-638 (Jan. 2013).
Shen et al., "Fast Coding Unit Size Selection for HEVC based on Bayesian Decision Rule," *Picture Coding Symp.*, pp. 453-456 (May 2012).
Shen et al., "Fast CU Size Decision and Mode Decision Algorithm for HEVC Intra Coding," *IEEE Trans. On Consumer Electronics*, vol. 59, No. 1, pp. 207-213 (Feb. 2013).
Written Opinion of the International Preliminary Examining Authority dated Jun. 8, 2017, from International Patent Application No. PCT/US2016/043028, 6 pp.
Bhaskaranand et al., "Low-complexity Video Encoding for UAV Reconnaissance and Surveillance," Proc. of Military Communications Conference, 6 pp. (Nov. 2011).
Fernando et al., "DFD Based Segmentation for H.263 Video Sequences," *IEEE Int'l Symp. On Circuits and Systems*, vol. 4, pp. 520-523 (May 1999).
Gardos et al., "Video Codec Test Model, Near-Term, Version 8 (TMN8)," ITU Study Group 16, Document Q15-A-59, 56 pp. (Jun. 1997).
Huade et al., "A Fast CU Size Decision Algorithm Based on Adaptive Depth Selection for HEVC Encoder," *IEEE Int'l Conf. on Audio, Language and Image Processing*, pp. 143-146 (Jul. 2014).
International Preliminary Report on Patentability dated Sep. 14, 2017, from International Patent Application No. PCT/US2016/043028, 7 pp.
Microsoft Corporation, "Codec API Properties," downloaded from the World Wide Web, 10 pp. (downloaded on Apr. 17, 2015).
Microsoft Corporation, "H.264 Video Encoder," downloaded from the World Wide Web, 8 pp. (downloaded on Apr. 17, 2015).
Microsoft Corporation, "ICodecAPI Interface," downloaded from the World Wide Web, 3 pp. (downloaded on Apr. 17, 2015).
Microsoft Corporation, "IMFSample Interface," downloaded from the World Wide Web, 3 pp. (downloaded on Apr. 17, 2015).
Microsoft Corporation, "IMFTransform Interface," downloaded from the World Wide Web, 3 pp. (downloaded on Apr. 17, 2015).
Microsoft Corporation, "Sample Attributes," downloaded from the World Wide Web, 3 pp. (downloaded on Apr. 17, 2015).
Rodriguez et al., "Using Telemetry Data for Video Compression on Unmanned Air Vehicles," *AIAA Guidance, Navigation and Control Conference*, 8 pp. (Aug. 2006).
Sullivan et al., "The H.264/AVC Advanced Video Coding Standard: Overview and Introduction to the Fidelity Range Extensions," *SPIE Conf. on Applications of Digital Image Processing*, vol. 5558, pp. 454-474 (Aug. 2004).
Usach-Molina et al., "Content-Based Dynamic Threshold Method for Real-Time Keyframe Selecting," *IEEE Trans. On Circuits and Systems for Video Technology*, vol. 20, No. 7, pp. 982-993 (Jul. 2010).

\* cited by examiner software 180 implementing one or more innovations
for encoding and performing skip-block detection

400

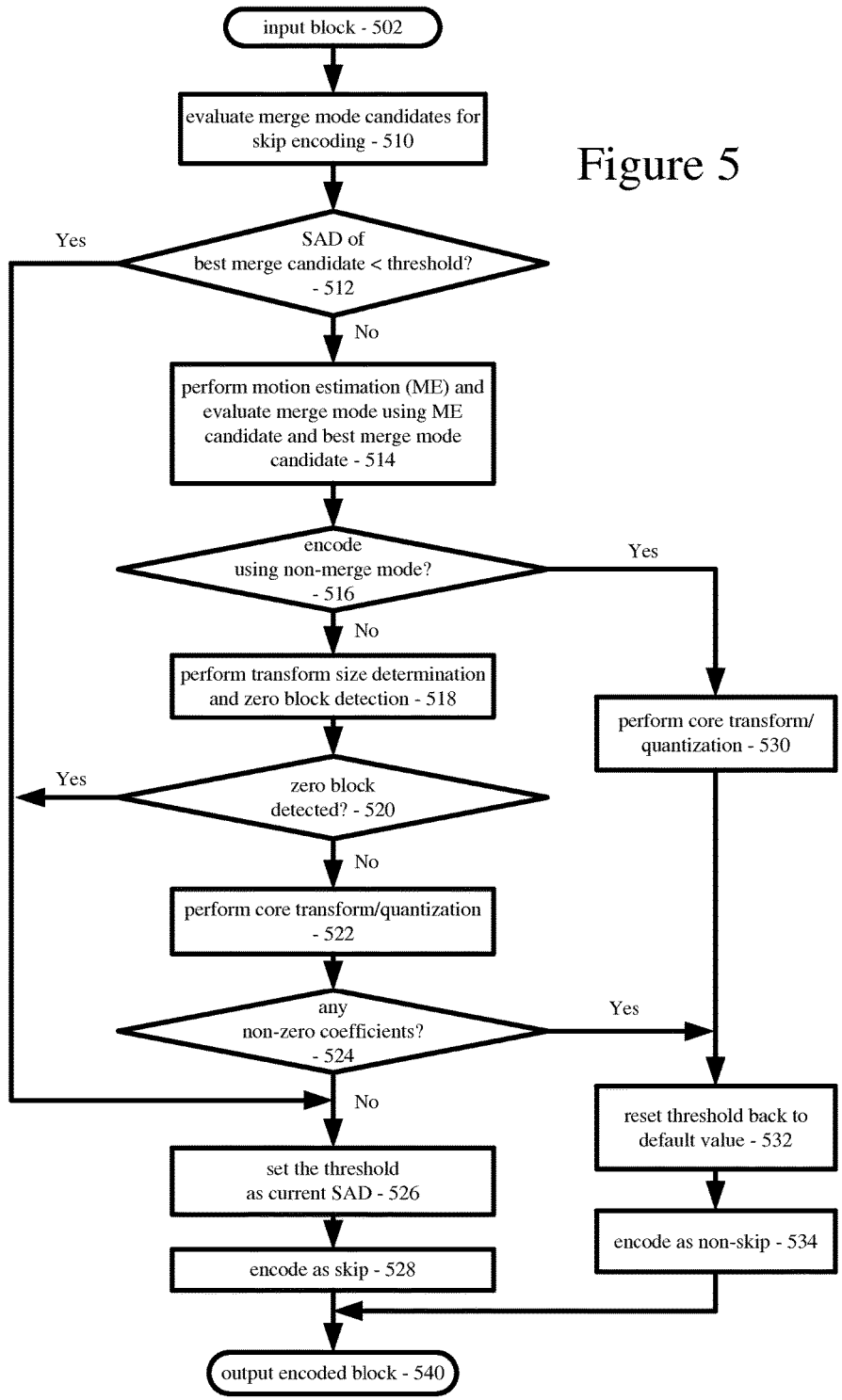

ADAPTIVE SKIP OR ZERO BLOCK DETECTION COMBINED WITH TRANSFORM SIZE DECISION

FIELD

The disclosed technology concerns embodiments for adaptively detecting skip and/or zero blocks during video encoding.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats define other options for the syntax of an encoded video bitstream and corresponding decoding operations.

As new video codec standards and formats have been developed, the number of coding tools available to a video encoder has steadily grown, and the number of options to evaluate during encoding for values of parameters, modes, settings, etc. has also grown. At the same time, consumers have demanded improvements in temporal resolution (e.g., frame rate), spatial resolution (e.g., frame dimensions), and quality of video that is encoded. As a result of these factors, video encoding according to current video codec standards and formats is very computationally intensive.

Despite improvements in computer hardware, video encoding remains time-consuming and resource-intensive in many encoding scenarios. In particular, in many cases, evaluation of whether a particular picture portion (e.g., a coding unit or block) has little or no changes from a previously encoded co-located picture portion, thereby making it a likely candidate for skip-mode encoding, during video encoding can be time-consuming and resource intensive.

SUMMARY

In summary, the detailed description presents innovations that can reduce the computational complexity and/or computational resource usage during video encoding by efficient and early evaluation of whether a particular picture portion will be encoded as a "skip" or "zero" picture portion. In particular examples, various implementations for modifying (adjusting) encoder behavior when evaluating a picture portion (e.g., a luma coding block of a coding unit) in accordance with the H.265/HEVC standard are disclosed. Although these examples concern the H.265/HEVC standard, the disclosed technology is more widely applicable to other video codecs that involve selection of whether a picture portion can be efficiently encoded by copying a previously encoded picture portion or starting from a previously encoded picture portion and applying encoded residual data. Such encoding mechanisms correspond to the "skip" and "merge mode" encoding mechanisms found in certain video codec standards (e.g., the H.265/HEVC standard).

Embodiments of the disclosed technology have particular application to scenarios in which efficient, fast encoding is desirable, such as real-time encoding situations (e.g., encoding of live events, video conferencing applications, and the like). For instance, embodiments of the disclosed technology can be used when an encoder is selected for operation in a low-latency and/or fast encoding mode (e.g., for real-time (or substantially real-time) encoding).

To improve encoder speed and reduce the computational burden used during encoding, a number of different encoding techniques can be used. For instance, in one example embodiment, the encoding of a picture in a video sequence comprises, for a current block of the picture being encoded: performing a simplified transform to the current block of the picture, the simplified transform including fewer computations than the core transform; evaluating whether the current block is to be encoded in a skip mode using results of the simplified transform; and encoding the current block according to the evaluation. In particular implementations, the simplified transform is a Hadamard transform. In another example embodiment, the encoding includes encoding a respective block of the picture by applying a series of skip-block detection procedures during the encoding of the respective block. In this embodiment, a first skip-block detection procedure is implemented prior to performing any motion estimation for the respective block; and a second skip-block detection procedure is implemented after performing motion estimation for the respective block and if the first skip block detection procedure fails to detect that the respective block is to be encoded in skip mode. In another example embodiment, the encoding of a picture in a video sequence comprises, for a current block of the picture being encoded: applying transforms (e.g., simplified transforms relative to a core transform (such as Hadamard transforms)) of different sizes to the current block; determining a transform size to be selectively applied during encoding and signaled for use by the decoder based on results of the application of the transforms of different sizes; and determining whether to encode the current block in a skip mode based on at least some of the results of the application of the transforms of different sizes.

The innovations can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 5 is a flow chart illustrating an exemplary embodiment for performing encoding according to the disclosed technology.

DETAILED DESCRIPTION

I. General Considerations

The detailed description presents innovations in the area of encoding pictures or portions of pictures (e.g., coding units or blocks) and specifying whether and how certain encoding operations (e.g., skip-mode encoding) should be performed by the encoder. The methods can be employed alone or in combination with one another to configure the encoder such that it operates in a computationally efficient manner during the evaluation of whether a particular picture portion should be encoded using a "skip" mode. By using embodiments of the disclosed technology, the encoder can operate with reduced computational complexity, using reduced computational resources (e.g., memory), and/or with increased speed. In particular examples, the disclosed embodiments concern the application of "skip" mode encoding (e.g., using the cu_skip_flag) as specified in the H.265/HEVC standard. Although these examples concern the H.265/HEVC standard and its skip mode encoding of coding units, the disclosed technology is more widely applicable to other video codecs that involve skip mode encoding.

Although operations described herein are in places described as being performed by a video encoder or decoder, in many cases the operations can be performed by another type of media processing tool (e.g., image encoder or decoder).

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Example Computing Systems

Figure 1:
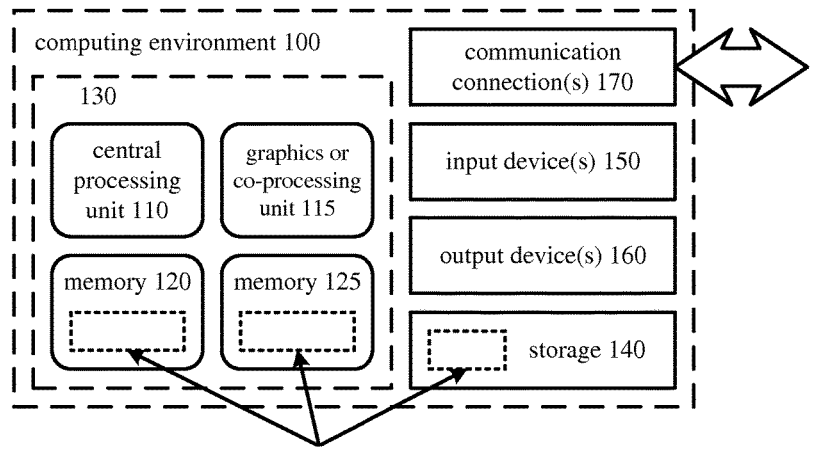
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing devices (110, 115) and memory (120, 125). The processing devices (110, 115) execute computer-executable instructions. A processing device can be a general-purpose central processing unit (CPU), a graphics processing unit (GPU), a processor of a system-on-a-chip (SOC), a specialized processing device implemented in an application-specific integrated circuit (ASIC) or field programmable gate array (FPGA), or any other type of processor. In a multi-processing system, multiple processing devices execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, NVRAM, etc.), or some combination of the two, accessible by the processing unit(s). The memory (120, 125) stores software (180) implementing one or more of the disclosed innovations in the form of computer-executable instructions suitable for execution by the processing device(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be one or more removable or non-removable storage devices, including magnetic disks, solid state drives, flash memories, magnetic tapes or cassettes, CD-ROMs, DVDs, or any other tangible medium which can be used to store information and which can be accessed within the computing system (100). The storage (140) does not encompass propagating carrier waves or signals per se. The storage (140) stores instructions for the software (180) implementing one or more of the disclosed innovations for encoding a picture of a video sequence using any of the disclosed techniques and/or skip-block detection methods.

The input device(s) (150) may be a touch input device such as a keyboard, mouse, pen, trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. Computer-readable media include memory (120, 125), storage (140), and combinations of any of the above, but do not encompass propagating carrier waves or signals per se.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor (DSP), a graphics processing unit (GPU), or a programmable logic device (PLD), such as a field programmable gate array (FPGA)) specially designed or configured to implement any of the disclosed methods.

III. Example Network Environments

Figure 2A:
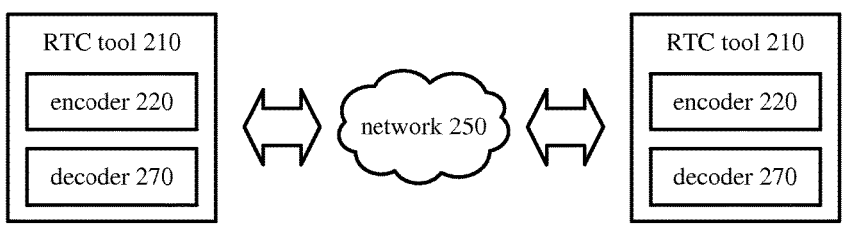
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication (RTC) tool (210) includes both an encoder (220) and a decoder (270) for bidirectional communication. A given encoder (220) can produce output compliant with a variation or extension of the H.265/HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
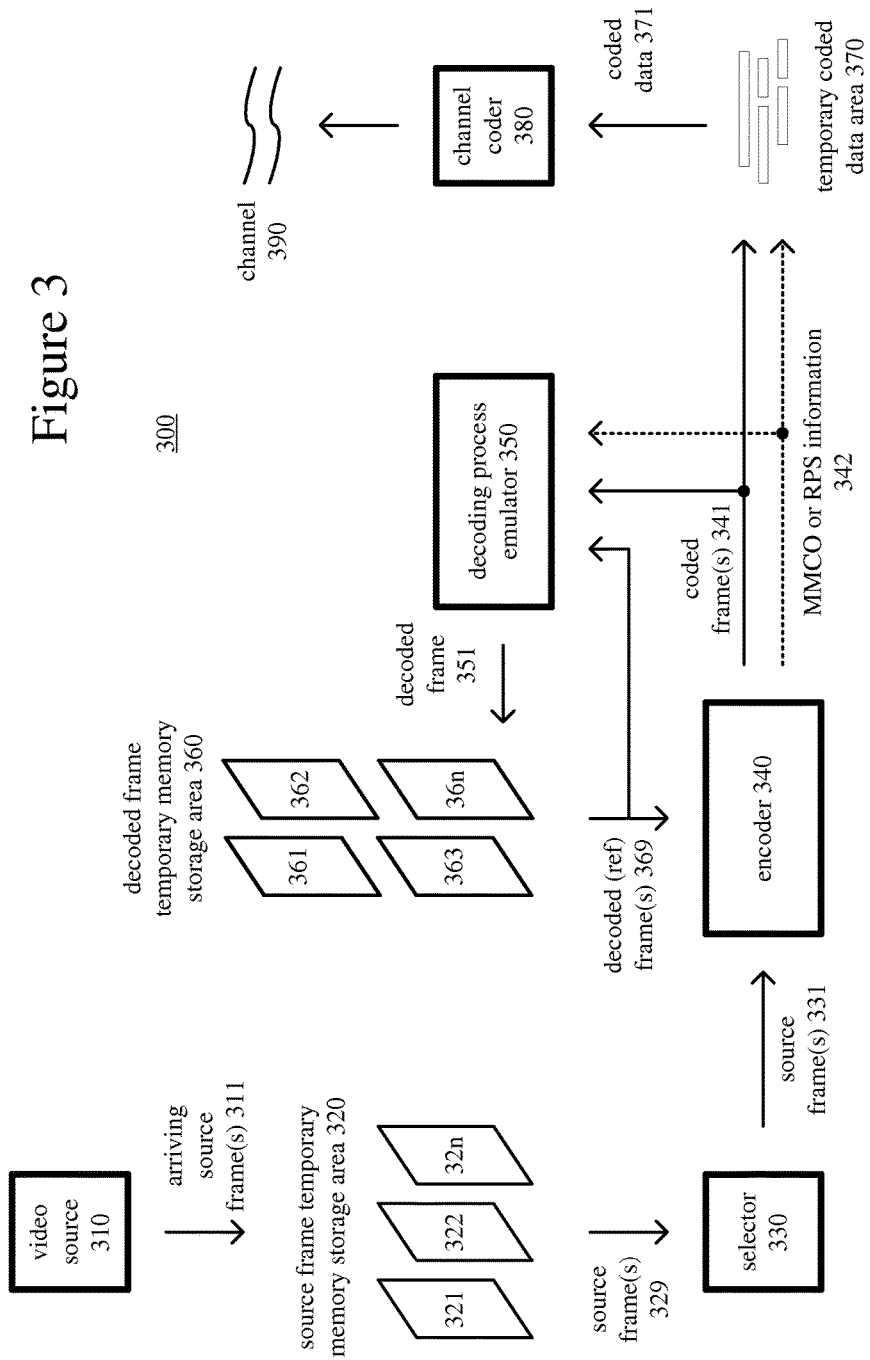
FIG. 3 is a diagram of an example encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270).

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, screen capture system, remote desktop conferencing presentation, video streaming, video downloading, video broadcasting, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214).

IV. Example Encoder Systems

FIG. 3 shows an example video encoder system (300) in conjunction with which some described embodiments may be implemented. The video encoder system (300) includes a video encoder (340), which is further detailed in FIGS. 4a and 4b.

The video encoder system (300) can be a general-purpose encoding tool capable of operating in any of multiple encoding modes such as a low-latency "fast" encoding mode for real-time communication (and further configured to use any of the disclosed embodiments), a transcoding mode, or a higher-latency encoding mode for producing media for playback from a file or stream, or it can be a special-purpose encoding tool adapted for one such encoding mode. The video encoder system (300) can be adapted for encoding of a particular type of content. The video encoder system (300) can be implemented as part of an operating system module, as part of an application library, as part of a standalone application, or using special-purpose hardware. Overall, the video encoder system (300) receives a sequence of source video pictures (311) from a video source (310) and produces encoded data as output to a channel (390). The encoded data output to the channel can include content encoded using any of the disclosed techniques and can include one or more flags in the bitstream indicating whether respective picture portions (e.g., coding units, or blocks) were encoded using a "skip" mode in accordance with the disclosed technology.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, ..., 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320) to encode as the current picture (331). The order in which pictures are selected by the picture selector (330) for input to the video encoder (340) may differ from the order in which the pictures are produced by the video source (310), e.g., the encoding of some pictures may be delayed in order, so as to allow some later pictures to be encoded first and to thus facilitate temporally backward prediction. Before the video encoder system (300), the video encoder system (300) can include a pre-processor (not shown) that performs pre-processing (e.g., filtering) of the current picture (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Thus, before encoding, video may be converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for a YUV 4:2:0 format or YUV 4:2:2 format), or the chroma sample values may have the same resolution as the luma sample values (e.g., for a YUV 4:4:4 format). Alternatively, video can be organized according to another format (e.g., RGB 4:4:4 format, GBR 4:4:4 format or BGR 4:4:4 format).

Figure 4A:
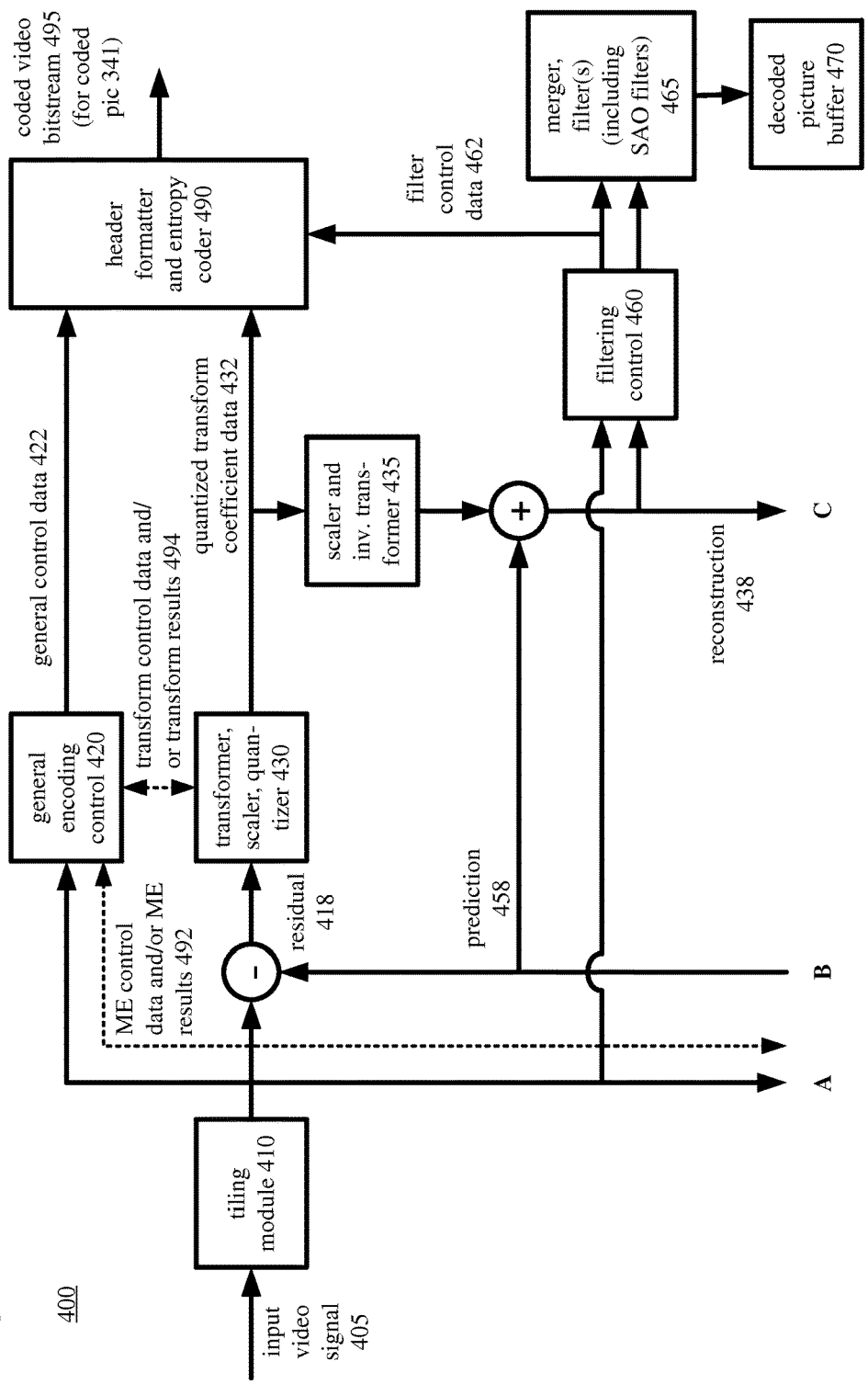
FIGS. 4a and 4b are diagrams illustrating an example video encoder in conjunction with which some described embodiments can be implemented.
Figure 4B:
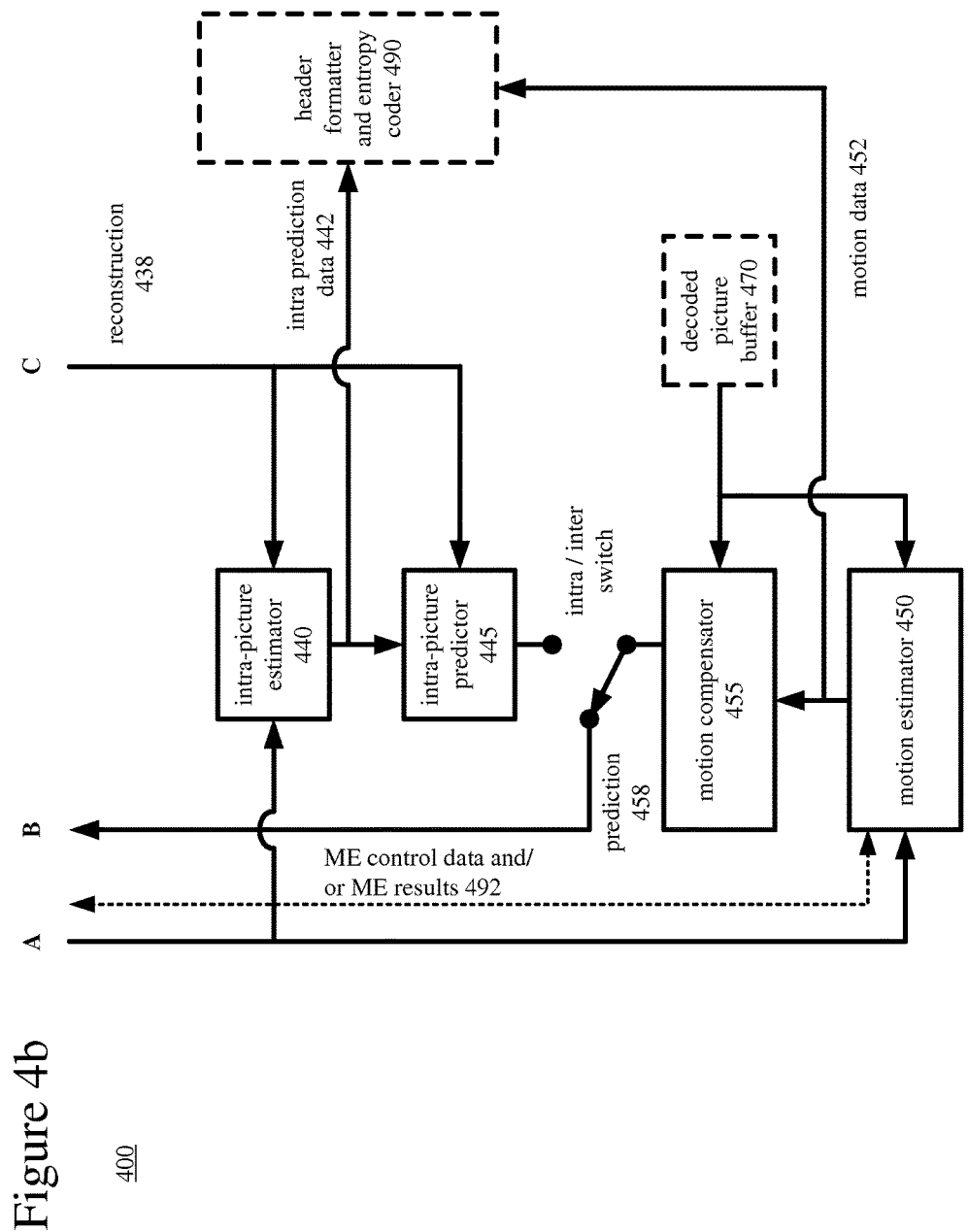

The video encoder (340) encodes the current picture (331) to produce a coded picture (341). As shown in FIGS. 4a and 4b, the video encoder (340) receives the current picture (331) as an input video signal (405) and produces encoded data for the coded picture (341) in a coded video bitstream (495) as output.

Generally, the video encoder (340) includes multiple encoding modules that perform encoding tasks such as partitioning into tiles, intra-picture prediction estimation and prediction, motion estimation and compensation, frequency transforms, quantization, and entropy coding. Many of the components of the video encoder (340) are used for both intra-picture coding and inter-picture coding. The exact operations performed by the video encoder (340) can vary depending on compression format and can also vary depending on encoder-optional implementation decisions. The format of the output encoded data can be Windows Media Video format, VC-1 format, MPEG-x format (e.g., MPEG-1, MPEG-2, or MPEG-4), H.26x format (e.g., H.261, H.262, H.263, H.264, H.265 (HEVC)), VPx format, a variation or extension of one of the preceding standards or formats, or another format.

As shown in FIG. 4a, the video encoder (340) can include a tiling module (410). With the tiling module (410), the video encoder (340) can partition a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding. Blocks may be further sub-divided at different stages, e.g., at the prediction, frequency transform and/or entropy encoding stages. For example, a picture can be divided into 64×64 blocks, 32×32 blocks, or 16×16 blocks, which can in turn be divided into smaller blocks of sample values for coding and decoding.

For syntax according to the H.264/AVC standard, the video encoder (340) can partition a picture into one or more slices of the same size or different sizes. The video encoder (340) splits the content of a picture (or slice) into 16×16 macroblocks. A macroblock includes luma sample values organized as four 8×8 luma blocks and corresponding chroma sample values organized as 8×8 chroma blocks. Generally, a macroblock has a prediction mode such as inter or intra. A macroblock includes one or more prediction units (e.g., 8×8 blocks, 4×4 blocks, which may be called partitions for inter-picture prediction) for purposes of signaling of prediction information (such as prediction mode details, motion vector (MV) information, etc.) and/or prediction processing. A macroblock also has one or more residual data units for purposes of residual coding/decoding.

For syntax according to the H.265/HEVC standard, the video encoder (340) splits the content of a picture (or slice or tile) into coding tree units. A coding tree unit (CTU) includes luma sample values organized as a luma coding tree block (CTB) and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit (CU) has a luma coding block (CB) and two corresponding chroma CBs. For example, according to quadtree syntax, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU includes one or more prediction units for purposes of signaling of prediction information (such as prediction mode details, displacement values, etc.) and/or prediction processing. A prediction unit (PU) has a luma prediction block (PB) and two chroma PBs. According to the H.265/HEVC standard, for an intra-picture-predicted CU, the PU has the same size as the CU, unless the CU has the smallest size (e.g., 8×8). In that case, the CU can be split into smaller PUs (e.g., four 4×4 PUs if the smallest CU size is 8×8, for intra-picture prediction) or the PU can have the smallest CU size, as indicated by a syntax element for the CU. For an inter-picture-predicted CU, the CU can have one, two, or four PUs, where splitting into four PUs is allowed only if the CU has the smallest allowable size.

In H.265/HEVC implementations, a CU also has one or more transform units for purposes of residual coding/decoding, where a transform unit (TU) has a luma transform block (TB) and two chroma TBs. A CU may contain a single TU (equal in size to the CU) or multiple TUs. According to quadtree syntax, a TU can be split into four smaller TUs, which may in turn be split into smaller TUs according to quadtree syntax. The video encoder decides how to partition video into CTUs (CTBs), CUs (CBs), PUs (PBs) and TUs (TBs).

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer (NAL) unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, residual data unit, CTB, CB, PB or TB, or some other set of sample values, depending on context. The term "unit" can indicate a macroblock, CTU, CU, PU, TU or some other set of blocks, or it can indicate a single block, depending on context.

As shown in FIG. 4a, the video encoder (340) includes a general encoding control (420), which receives the input video signal (405) for the current picture (331) as well as feedback (not shown) from various modules of the video encoder (340). Overall, the general encoding control (420) provides control signals (not shown) to other modules, such as the filtering control (460), tiling module (410), transformer/scaler/quantizer (430), scaler/inverse transformer (435), intra-picture prediction estimator (440), motion estimator (450) and intra/inter switch, to set and change coding parameters during encoding. The general encoding control (420) can evaluate intermediate results during encoding, typically considering bit rate costs and/or distortion costs for different options.

According to embodiments of the disclosed technology, the general encoding control (420) also decides whether a particular block currently being encoded is to be encoded as a "skip" block using a skip encoding mode. For example, in the context of the H.265/HEVC standard and according to one exemplary implementation, the general encoding control (420) decides whether a luma coding block currently being encoded is to be encoded as a "skip" block using skip mode encoding and, if so, causing the cu_skip_flag syntax element for the coding unit (CU) to which the luma coding block belongs to be set to specify the CU as a "skip" CU encoded using the skip mode (e.g., by setting the cu_skip_flag for the associated coding unit to "1"). For instance, and as described more fully in Section V below, the general encoding control (420) can perform a series of skip-block (or zero-block) detection procedures (sometimes referred to as skip-mode detection procedures) during encoding of a respective block so that unnecessary and computationally expensive encoding operations are avoided as early as possible. In concert with the application of these detection procedures, the general encoding control (420) can selectively control when motion estimation is performed by motion estimator (450) and/or when transformation and quantization (using the core transformation of the encoder and as specified by the relevant video codec) is performed by the transformer/scaler/quantizer (430). In certain examples, and as more fully explained below, the general encoding control (420) can avoid application of one or both of motion estimation by motion estimator (450) and transformation, scaling, and quantization by transformer/scaler/quantizer (430) using one of the detection techniques disclosed herein. Still further, in some embodiments, the general encoding control (420) can selectively perform motion estimation and receive motion estimation results (shown as motion estimation control data and motion estimation results (492)) according to embodiments of the disclosed technology, and use the motion estimation results as part of the encoding and skip-mode determination process. The general encoding control (420) can also selectively perform transformation and quantization and receive quantized transformed results (shown as transform control data and transform results (494)) according to embodiments of the disclosed technology, and use the quantized transformed results as part of the encoding and skip-mode determination process.

In many situations, the general encoding control (420) can help the video encoder (340) avoid time-consuming motion estimation and/or transformation operations (e.g., using control data 492 and/or 494) by determining that a current block being encoded is to be encoded in a skip mode prior to such operations using embodiments of the disclosed techniques. Such techniques can be used, for example, when encoding speed is important (e.g., as in a real-time encoding environment or when the encoder is operating in a low-latency and/or fast encoding mode).

The general encoding control (420) produces general control data (422) that indicates decisions made during encoding, so that a corresponding decoder can make consistent decisions. The general control data (422) is provided to the header formatter/entropy coder (490). The general control data (422) can be influenced by encoding decisions made by the general encoding control (420) with respect to whether a particular block is to be encoded in a skip mode or not in accordance with any of the disclosed techniques.

With reference to FIG. 4b, if a unit the current picture (331) is predicted using inter-picture prediction, a motion estimator (450) estimates the motion of blocks of sample values of the unit with respect to one or more reference pictures. The current picture (331) can be entirely or partially coded using inter-picture prediction. When multiple reference pictures are used, the multiple reference pictures can be from different temporal directions or the same temporal direction. The motion estimator (450) potentially evaluates candidate motion vectors (MVs) in a contextual motion mode as well as other candidate MVs. For contextual motion mode, as candidate MVs for the unit, the motion estimator (450) evaluates one or more MVs that were used in motion compensation for certain neighboring units in a local neighborhood or one or more MVs derived by rules. The candidate MVs for contextual motion mode can include MVs from spatially adjacent units, MVs from temporally adjacent units, and MVs derived by rules. Merge mode and skip mode in the H.265/HEVC standard are examples of contextual motion modes. In some cases, a contextual motion mode can involve a competition among multiple derived MVs and selection of one of the multiple derived MVs. The motion estimator (450) can evaluate different partition patterns for motion compensation for partitions of a given unit of the current picture (331) (e.g., 2N×2N, 2N×N, N×2N, or N×N partitions for PUs of a CU in the H.265/HEVC standard).

The decoded picture buffer (470), which is an example of decoded picture temporary memory storage area (360) as shown in FIG. 3, buffers one or more reconstructed previously coded pictures for use as reference pictures. The motion estimator (450) produces motion data (452) as side information. The motion data (452) can include MV data and reference picture selection data. In particular embodiments, the motion data (452) can be provided to the general encoding control (420), which can use the motion data (452) in accordance with embodiments of the disclosed technology to generate information that indicates whether a contextual motion mode (e.g., merge mode or skip mode as in the H.265/HEVC standard) is used and, if so, the candidate MV for the contextual motion mode (e.g., the merge candidate index value in the H.265/HEVC standard). Such motion data (452) and contextual motion mode information is provided to the header formatter/entropy coder (490) as well as the motion compensator (455). The motion compensator (455) applies MV(s) for a block to the reconstructed reference picture(s) from the decoded picture buffer (470). For the block, the motion compensator (455) produces a motion-compensated prediction, which is a region of sample values in the reference picture(s) that are used to generate motion-compensated prediction values for the block.

With reference to FIG. 4b, if a unit of the current picture (331) is predicted using intra-picture prediction, an intra-picture prediction estimator (440) determines how to perform intra-picture prediction for blocks of sample values of the unit. The current picture (331) can be entirely or partially coded using intra-picture prediction. Using values of a reconstruction (438) of the current picture (331), for intra spatial prediction, the intra-picture prediction estimator (440) determines how to spatially predict sample values of a block of the current picture (331) from neighboring, previously reconstructed sample values of the current picture (331), e.g., estimating extrapolation of the neighboring reconstructed sample values into the block. As side information, the intra-picture prediction estimator (440) produces intra prediction data (442), such as information indicating whether intra prediction uses spatial prediction and, if so, the IPPM used. The intra prediction data (442) is provided to the header formatter/entropy coder (490) as well as the intra-picture predictor (445). According to the intra prediction data (442), the intra-picture predictor (445) spatially predicts sample values of a block of the current picture (331) from neighboring, previously reconstructed sample values of the current picture (331), producing intra-picture prediction values for the block.

As shown in FIG. 4b, the intra/inter switch selects whether the predictions (458) for a given unit will be motion-compensated predictions or intra-picture predictions. Intra/inter switch decisions for units of the current picture (331) can be made using various criteria.

The video encoder (340) can determine whether or not to encode and transmit the differences (if any) between a block's prediction values (intra or inter) and corresponding original values. The differences (if any) between a block of the prediction (458) and a corresponding part of the original current picture (331) of the input video signal (405) provide values of the residual (418). If encoded/transmitted, the values of the residual (418) are encoded using a frequency transform (if the frequency transform is not skipped), quantization, and entropy encoding. In some cases (such as in the "skip" mode of the H.265/HEVC standard and as described herein), no residual is calculated for a unit. Instead, residual coding is skipped, and the predicted sample values are used as the reconstructed sample values. The decision about whether to skip residual coding can be made on a unit-by-unit basis (e.g., CU-by-CU basis in the H.265/HEVC standard) for some types of units (e.g., only inter-picture-coded units) or all types of units.

With reference to FIG. 4a, when values of the residual (418) are encoded, in the transformer/scaler/quantizer (430), a frequency transformer converts spatial-domain video information into frequency-domain (i.e., spectral, transform) data. For block-based video coding, the frequency transformer applies a discrete cosine transform (DCT), an integer approximation thereof, or another type of forward block transform (e.g., a discrete sine transform or an integer approximation thereof) to blocks of values of the residual (418) (or sample value data if the prediction (458) is null), producing blocks of frequency transform coefficients. All such transforms performed by the transformer/scaler/quantizer (430) are referred to herein as the "core transform", as they represent the transform ultimately applied to the video data and for which a corresponding inverse transform will be applied by the decoder to reconstruct the video data. Further, the core transform is typically defined and essential to the codec standard according to which the encoder (340) operates.

The transformer/scaler/quantizer (430) can apply a core transform with variable block sizes. In this case, the transformer/scaler/quantizer (430) can determine which block sizes of the core transforms to use for the residual values for a current block. For example, in H.265/HEVC implementations, the transformer/scaler/quantizer (430) can split a TU by quadtree decomposition into four smaller TUs, each of which may in turn be split into four smaller TUs, down to a minimum TU size. TU size can be 32×32, 16×16, 8×8, or 4×4 (referring to the size of the luma TB in the TU).

In H.265/HEVC implementations, the frequency transform can be skipped. In this case, values of the residual (418) can be quantized and entropy coded.

With reference to FIG. 4a, in the transformer/scaler/quantizer (430), a scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantization step size can depend on a quantization parameter (QP), whose value is set for a picture, tile, slice, and/or other portion of video. The quantized transform coefficient data (432) is provided to the header formatter/entropy coder (490). If the frequency transform is skipped, the scaler/quantizer can scale and quantize the blocks of prediction residual data (or sample value data if the prediction (458) is null), producing quantized values that are provided to the header formatter/entropy coder (490). When quantizing transform coefficients, the video encoder (340) can use rate-distortion-optimized quantization (RDOQ), which is very time-consuming, or apply simpler quantization rules.

As shown in FIGS. 4a and 4b, the header formatter/entropy coder (490) formats and/or entropy codes the general control data (422), quantized transform coefficient data (432), intra prediction data (442), motion data (452), and filter control data (462). The entropy coder of the video encoder (340) compresses quantized transform coefficient values, when applicable, and/or certain side information (e.g., MV information, QP values, mode decisions, parameter choices). Typical entropy coding techniques include Exponential-Golomb coding, Golomb-Rice coding, arithmetic coding, differential coding, Huffman coding, run length coding, variable-length-to-variable-length (V2V) coding, variable-length-to-fixed-length (V2F) coding, Lempel-Ziv (LZ) coding, dictionary coding, and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

The video encoder (340) produces encoded data for the coded picture (341) in an elementary bitstream, such as the coded video bitstream (495) shown in FIG. 4a. In FIG. 4a, the header formatter/entropy coder (490) provides the encoded data in the coded video bitstream (495). The syntax of the elementary bitstream is typically defined in a codec standard or format, or extension or variation thereof. For example, the format of the coded video bitstream (495) can be a Windows Media Video format, VC-1 format, MPEG-x format (e.g., MPEG-1, MPEG-2, or MPEG-4), H.26x format (e.g., H.261, H.262, H.263, H.264, H.265 (HEVC)), VPx format, a variation or extension of one of the preceding standards or formats, or another format. After output from the video encoder (340), the elementary bitstream is typically packetized or organized in a container format, as explained below.

The encoded data in the elementary bitstream includes syntax elements organized as syntax structures. In general, a syntax element can be any element of data, and a syntax structure is zero or more syntax elements in the elementary bitstream in a specified order. In the H.264/AVC standard and H.265/HEVC standard, a NAL unit is a syntax structure that contains (1) an indication of the type of data to follow and (2) a series of zero or more bytes of the data. For example, a NAL unit can contain encoded data for a slice (coded slice). The size of the NAL unit (in bytes) is indicated outside the NAL unit. Coded slice NAL units and certain other defined types of NAL units are termed video coding layer (VCL) NAL units. An access unit is a set of one or more NAL units, in consecutive decoding order, containing the encoded data for the slice(s) of a picture, and possibly containing other associated data such as metadata.

For syntax according to the H.264/AVC standard or H.265/HEVC standard, a picture parameter set (PPS) is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.264/AVC standard or H.265/HEVC standard, a sequence parameter set (SPS) is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

As shown in FIG. 3, the video encoder (340) also produces memory management control operation (MMCO) signals (342) or reference picture set (RPS) information. The RPS is the set of pictures that may be used for reference in motion compensation for a current picture or any subsequent picture. If the current picture (331) is not the first picture that has been encoded, when performing its encoding process, the video encoder (340) may use one or more previously encoded/decoded pictures (369) that have been stored in a decoded picture temporary memory storage area (360). Such stored decoded pictures (369) are used as reference pictures for inter-picture prediction of the content of the current picture (331). The MMCO/RPS information (342) indicates to a video decoder which reconstructed pictures may be used as reference pictures, and hence should be stored in a picture storage area.

With reference to FIG. 3, the coded picture (341) and MMCO/RPS information (342) (or information equivalent to the MMCO/RPS information (342), since the dependencies and ordering structures for pictures are already known at the video encoder (340)) are processed by a decoding process emulator (350). The decoding process emulator (350) implements some of the functionality of a video decoder, for example, decoding tasks to reconstruct reference pictures. In a manner consistent with the MMCO/RPS information (342), the decoding process emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a video decoder that receives the coded picture (341) and produces a corresponding decoded picture (351). In doing so, when the video encoder (340) has used decoded picture(s) (369) that have been stored in the decoded picture storage area (360), the decoding process emulator (350) also uses the decoded picture(s) (369) from the storage area (360) as part of the decoding process.

The decoding process emulator (350) may be implemented as part of the video encoder (340). For example, the decoding process emulator (350) includes modules and logic as shown in FIGS. 4a and 4b. During reconstruction of the current picture (331), when values of the residual (418) have been encoded/signaled, reconstructed residual values are combined with the prediction (458) to produce an approximate or exact reconstruction (438) of the original content from the video signal (405) for the current picture (331). (In lossy compression, some information is lost from the video signal (405).)

To reconstruct residual values, in the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the video encoder (340) combines reconstructed residual values with values of the prediction (458) (e.g., motion-compensated prediction values, intra-picture prediction values) to form the reconstruction (438). When residual values have not been encoded/signaled, the video encoder (340) uses the values of the prediction (458) as the reconstruction (438).

For intra-picture prediction, the values of the reconstruction (438) can be fed back to the intra-picture prediction estimator (440) and intra-picture predictor (445). For inter-picture prediction, the values of the reconstruction (438) can be used for motion-compensated prediction of subsequent pictures. The values of the reconstruction (438) can be further filtered. A filtering control (460) determines how to perform deblock filtering and sample adaptive offset (SAO) filtering on values of the reconstruction (438), for the current picture (331). The filtering control (460) produces filter control data (462), which is provided to the header formatter/entropy coder (490) and merger/filter(s) (465). The filtering control (460) can be controlled, in part, by general encoding control (420).

In the merger/filter(s) (465), the video encoder (340) merges content from different tiles into a reconstructed version of the current picture. In the merger/filter(s) (465), the video encoder (340) also selectively performs deblock filtering and SAO filtering according to the filter control data (462) and rules for filter adaptation, so as to adaptively smooth discontinuities across boundaries in the current picture (331).

Other filtering (such as de-ringing filtering or adaptive loop filtering (ALF); not shown) can alternatively or additionally be applied. Tile boundaries can be selectively filtered or not filtered at all, depending on settings of the video encoder (340), and the video encoder (340) may provide syntax elements within the coded bitstream to indicate whether or not such filtering was applied.

In FIGS. 4a and 4b, the decoded picture buffer (470) buffers the reconstructed current picture for use in subsequent motion-compensated prediction. More generally, as shown in FIG. 3, the decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the video encoder (340) for use as reference pictures. After modeling the decoding process, the decoding process emulator (350) stores a newly decoded picture (351) in a picture buffer (361, 362, etc.) that has been identified in this manner.

As shown in FIG. 3, the coded picture (341) and MMCO/RPS information (342) are buffered in a temporary coded data area (370). The coded data that is aggregated in the coded data area (370) contains, as part of the syntax of the elementary bitstream, encoded data for one or more pictures. The coded data that is aggregated in the coded data area (370) can also include media metadata relating to the coded video data (e.g., as one or more parameters in one or more supplemental enhancement information (SEI) messages or video usability information (VUI) messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction (FEC) encoding and analog signal modulation.

V. Exemplary Methods for Computationally Efficient Encoder-Side Skip-Block or Zero-Block Encoding Disclosed below are example methods that can be performed by an encoder to determine whether, and at what stage of the encoding process, to encode a block as a skip block and/or zero block using skip mode encoding. For instance, in the context of the H.265/HEVC standard, the methods can be used to determine whether to set the cu_skip_flag syntax element for a particular coding unit. The determination can, for example, be based on an evaluation of the luminance values in the luma coding block of the coding unit. If the methods determine that the evaluated block is a skip block to be encoded in skip mode (and therefore, for example, that the associated cu_skip_flag should be set to indicate skip mode encoding for the coding unit), the encoding of the associated coding unit can be efficiently performed in a skip mode by signaling the index of the merge mode candidate from which the motion vectors (and/or other motion information) are to be copied for the luma coding block (as well as the chroma coding blocks) in the associated coding unit. Further, in some embodiments (e.g., H.265/HEVC), when encoding is performed in the skip mode, no residual data is encoded, making the encoding highly efficient.

The methods can be used, for example, to modify and/or control the encoder-side processing that evaluates blocks of a picture (e.g., luma coding blocks) for skip-mode encoding in order to reduce the computational effort (e.g., to reduce computational complexity and computational resource usage) and increase the speed with which encoding is performed. For instance, the methods can be used when the encoder is operating in a low-latency and/or high-speed mode. In particular implementations, the methods are performed at least in part by the general encoding control (420).

The disclosed examples should not be construed as limiting, as they can be modified in many ways without departing from the principles of the underlying invention. Also, any of the methods can be used alone or in combination with one or more other methods disclosed herein.

FIG. 5 is a flowchart (500) illustrating an example process for encoding a block of a video sequence of pictures using aspects of the disclosed technology. In particular, the flowchart (500) shows a process by which a block from a current picture being encoded can be encoded according to embodiments of the disclosed technology. The disclosed embodiment can be performed by a computing device implementing a video encoder, which may be further configured to produce a bitstream compliant with the H.265/HEVC standard. The particular embodiment illustrated should not be construed as limiting, as the disclosed method acts can be performed alone, in different orders, or at least partially simultaneously with one another. Further, any of the disclosed methods or method acts can be performed with any other methods or method acts disclosed herein.

At (502), a block from a current picture being encoded is input for processing. The block can be any suitable portion of the current picture. For instance, the block can correspond to a CTB, CB, PB or TB of a current picture being encoded (e.g., a luma CTB, CB, PB or TB of the current picture being encoded).

Figure 7:
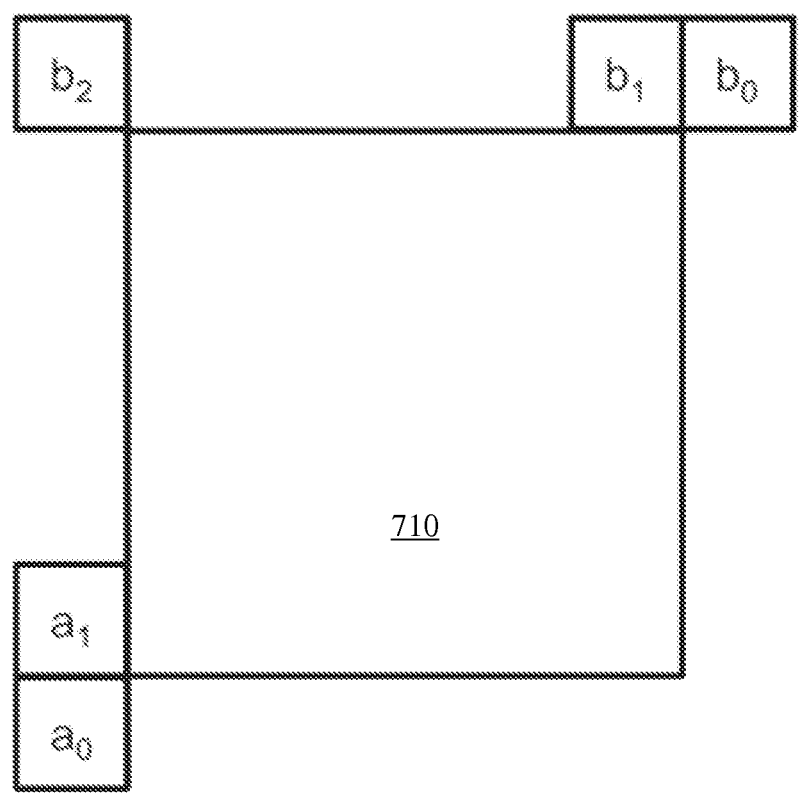
FIG. 7 is a block diagram illustrating merge mode candidates that are used in certain embodiments of the disclosed technology.

At (510), merge mode candidates are evaluated to determine whether the block can be encoded in a skip mode using one of the merge mode candidates. In particular embodiments, the merge mode candidates correspond to the luma coding block candidates specified by the H.265/HEVC standard and include five spatial neighbor candidates and a temporal candidate (e.g., the co-located block from the previously encoded picture closest temporally to the current picture being encoded). FIG. 7 is block diagram 700 illustrating the five spatial neighboring candidates relative to a current block 710 for an example implementation. The five spatial neighboring candidates are designated $a_1$, $b_1$, $b_0$, $a_0$, $b_2$, and, in some implementations, are evaluated in that order. In certain implementations, if the block located at one of these candidate positions is outside of the current slice or tile, it is considered unavailable. Further, in particular implementations, the evaluation is performed for each of the merge mode candidates and comprises applying the motion vectors from a merge mode candidate, computing the residual values relative to the block being encoded, and computing a sum of absolute differences (SAD) of the residual values.

At (512), a determination is made as to whether the SAD of the best merge mode candidate from (510) satisfies a SAD threshold value. For instance, a comparison can be performed to determine whether the SAD of the best candidate (e.g., the lowest SAD from among the candidates) is less than (or less than or equal to) the SAD threshold value. If so, then the current block being encoded can be determined to be a skip block and, at (528), encoded in a skip mode (e.g., by setting the appropriate syntax element (such as cu_skip_flag for the associated coding unit)) and signaling the reference index for the merge mode candidate to be used during decoding. (In some embodiments, and in accordance with the H.265/HEVC standard, additional residual data is not encoded for skip-mode encoded blocks.) Furthermore, in the illustrated embodiment and when the current block is determined to be a skip mode block at (512), the SAD threshold is adaptively adjusted (526) so that the SAD of the best candidate becomes the new SAD threshold. If the SAD of the best merge mode candidate does not satisfy the SAD threshold value, then the process continues at (514).

The evaluation at (510) and determination at (512) form a first skip-block detection procedure. In the illustrated embodiments, the first skip-block detection procedure is performed very early in the encoding process for a block (e.g., before motion estimation, transformation using the core transform, and quantization). In this sense, the first skip-block detection procedure is "blind" to other encoding opportunities, such as encoding in a non-merge mode using a motion vectors generated from the motion estimator (e.g., motion estimator (450)).

At (514), motion estimation is performed to compute a candidate set of motion vectors for predicting the motion of the current block. An evaluation is then made comparing this motion estimation candidate to the best of the merge mode candidates. This process typically evaluates the two candidates not only in terms of overall quality of prediction but also in terms of coding efficiency. Thus, a desired balance between prediction quality and encoding speed/bitstream overhead can be achieved. Consequently, the motion estimation candidate is not necessarily selected, even though it may have better quality results.

At (516), based on the evaluation at (514), a determination is made as to whether the current block is to be encoded in a non-merge mode using the motion estimation candidate. If so, then the current block is encoded using a non-merge-mode encoding process that includes application of the core transform and quantization (530), resetting of the SAD threshold back to a default value (532), and encoding of the block as a non-skip block in a non-skip mode (534) (e.g., by setting the appropriate syntax elements (such as, in the context of the H.265/HEVC standard, setting the cu_skip_flag for the associated coding unit to signal that it is encoded in a non-skip mode)). If the current block is not to be encoded using the motion estimation candidate, then the process continues at (518) and additional zero block detection procedures are performed.

At (518), a transform size determination procedure and a zero block detection procedure are performed. In particular embodiments, the transform size determination and a zero block detection procedure are performed in a combined fashion. For instance, an example process for performing a combined transform size determination and zero block detection procedure is illustrated in flowchart (600) of FIG. 6.

Figure 6:
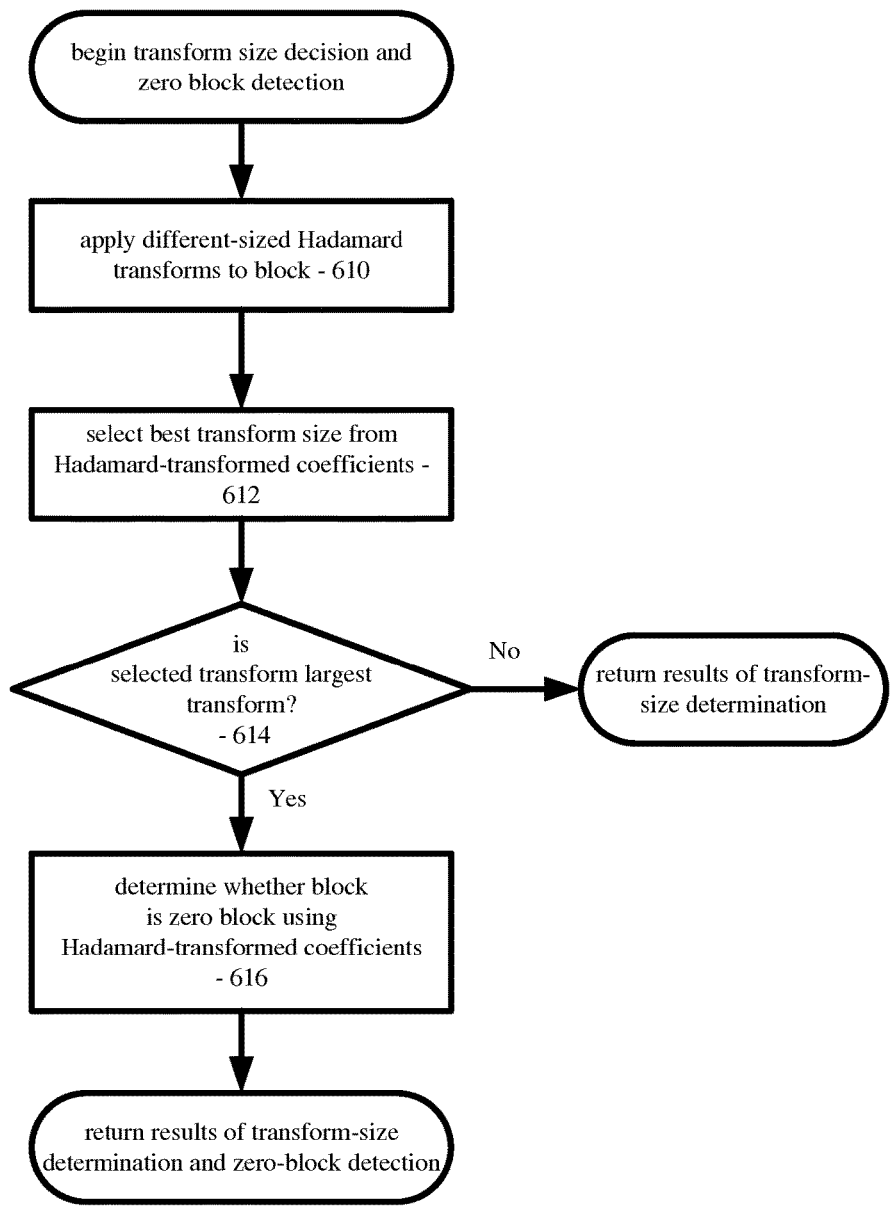
FIG. 6 is a flow chart illustrating an exemplary embodiment for performing the transformation and zero block detection process of FIG. 5 in accordance with an embodiment of the disclosed technology.

In the example illustrated in FIG. 6, at (610), simplified transforms of various sizes are applied to the current block being encoded. For instance, the simplified transform can be a transform process that involves fewer (or simpler) computations than the core transform, and thus can be performed quickly. Further, in certain implementations, the transform coefficients produced are not used in any final transform applied to the block, and thus can be discarded after the procedures at (600) are complete. In particular implementations, and as illustrated in FIG. 6, the simplified transform applied at (610) is the Hadamard transform. Further, the various sizes that are applied to the block can vary from implementation to implementation and can further depend on the size of the block being encoded. In general, the transform sizes applied will include a transform of the same size as the block as well as multiple smaller-sized transforms (e.g., for a 32×32 block, 32×32, 16×16, 8×8, 4×4 transforms will be applied). As one example, if the block being encoded is a 16×16 block, then simplified transforms (e.g., Hadamard transforms) of various sizes are applied (e.g., 1 16×16 Hadamard transform, 4 8×8 Hadamard transforms, and 16 4×4 Hadamard transforms).

At (612), the size of the core transform to apply is selected from the results of the simplified transforms. For instance, using the resulting transform coefficients for each size of the simplified transforms, a determination can be made as to which transform size should be used for the core transform (if it is eventually determined that the core transform is to be applied). In particular implementations, the sum of absolute transformed differences (SATD) can be computed for the transforms of a particular size and compared to one another; the transform size having the lowest SATD can then be selected as the transform size to apply during any core transformation performed.

In accordance with embodiments of the disclosed technology, a zero block determination can also be based on the results from the simplified transforms. Further, in certain embodiments, the zero block detection process performed at (616) may be contingent upon the transform size selected. For instance, in particular implementations, and as shown at (614) of FIG. 6, a determination is made as to whether the selected transform is the largest applicable transform size (e.g., for a 32×32 block, the selected transform size is a 32×32 transform; for a 16×16 block, the selected transform size is a 16×16 transform; and so on). If so, then a zero block detection procedure is performed at (616); if not, then the process returns the results of the transform size determination without performing a zero block detection procedure.

At (616), a zero-block detection procedure is performed. This zero-block detection procedure effectively operates as a second skip-block detection procedure in the process (500) shown in FIG. 5. This second skip-block detection procedure is performed after motion estimation, but before any core transformation/scaling/quantization is performed at (522), thus creating a second opportunity for computational savings during block encoding. In the illustrated embodiment, a determination is made at (616) as to whether the block is a zero block using results of the simplified transform. For instance, in particular embodiments, the transform coefficients from the simplified transform (e.g., the Hadamard-transformed coefficients) of the selected transform size (from the largest applicable transform size) are used to determine whether the block is a zero block.

The zero-block determination procedure at (616) can be performed using a variety of zero block detection methods that are applied to the transformed coefficients. In certain example embodiments, the transformed coefficients are first quantized, and the quantized results are evaluated to determine whether the block is to be encoded as a zero block. For instance, in particular implementations, if all quantized values of the transform coefficients are zero ("0"), then the block can be determined to be a zero block. In this embodiment, the quantization performed to the transformed coefficients can be based at least in part on the quantization parameter (QP) generally applied by the encoder during core transform and quantization operations (e.g., by the transformer/scaler/quantizer (430) at (522)). For instance, in one particular implementation, the quantization of the transformed coefficients proceeds as follows:

$$Q'=Q>>(QP/6+1)$$

where Q represents the transformed coefficients, Q' represents the quantized coefficients, and QP is the quantization parameter normally applied by the encoder. The quantization level performed (QP/6+1) is thus based on the quantization parameter (QP). The resulting quantized transform coefficients can then be evaluated. For example, if the resulting quantized transform coefficients are evaluated and determined to include any non-zero quantized transform coefficients, then the block is determined to be a non-zero block. If, however, the resulting quantized transform coefficients are evaluated and determined to all be zero ("0"), then the block is determined to be a zero block.

In another example embodiment, the maximum (highest valued) transformed coefficient for the block is compared to a threshold value based on the quantization parameter (QP), and a determination is made as to whether the block is a zero block or non-zero block. For example, in one example implementation, the evaluation proceeds according to the following inequality evaluation:

$$\text{maxcoeff\_of\_block} > (1 << (QP/6+1))$$

where maxcoeff_of_block is the largest coefficient from the transformed block, and QP is the quantization parameter normally applied by the encoder during transformation and quantization operations. In this implementation, if the inequality evaluation is satisfied (the largest coefficient is greater than the QP-based threshold value (here: $(1<<(QP/6+1))$), then the block is determined to be a non-zero block. If, however, the inequality evaluation is not satisfied, then the block is determined to be a zero block and can be encoded as a skip block using skip mode encoding.

Returning to FIG. 5, the results of the zero-block detection (518) are used at (520) to determine whether the block is a zero block or not. If the block is determined to be a zero block, then the block is encoded using the skip mode (528) and the threshold SAD is adjusted to be the SAD of the current block (526). If the block is determined to be a non-zero block at (520), then the encoding process continues at (522).

At (522), the normal transformation and quantization encoding process is performed. In particular, the core transform (e.g., a DCT transform or approximation thereof) is applied to the block and the resulting transform coefficients are quantized. This transformation and quantization process can be computationally expensive, and is therefore desirably avoided by detecting that the block can be encoded in the skip mode using the disclosed skip-block/zero-block detection methods early in the encoding pipeline.

Even after application of the normal (core) transformation, the encoded block may still be determined to be a zero block that can be encoded in skip mode. Thus, at (524), a determination is made as to whether the post-core-transform quantized transform coefficients of the block contain any non-zero coefficients (or, equivalently, whether the quantization transform coefficients are all zero). If the post-core-transform quantized transform coefficients include a non-zero transform coefficient, then the block is determined to be a non-zero block that is not to be encoded using the skip mode. In this case, at (532), the SAD threshold is reset to its default value, and at (534), the block is encoded in a non-skip mode.

At (540), the encoded block is output. The encoded block can be the skip-mode encoded, non-skip-mode encoded block, and can comprise the appropriate syntax elements and accompanying reference indices, residual values, etc., as appropriate. For example, an encoded block in compliance with a particular codec (e.g., the H.265/HEVC standard) can be output.

In particular embodiments, the process (500) illustrated in FIG. 5 is performed for each block (e.g., each luma coding block) of a picture, but the adaptively adjusted thresholds are unique and separately adaptable for each block location of a picture. Thus, if a threshold is adjusted for a first block at a first location, the adjusted threshold will be applied during encoding of a second block at the first location (the co-located position with the first block) for the next picture encoded. In other words, each block location can have its own set of adaptive thresholds that is maintained and adapted as co-located blocks are encoded for subsequent pictures of the video sequence. Further, in some encoder embodiments, the block sizes are constant, whereas in other embodiments, the block sizes are allowed to vary from picture to picture. In the case of variable block sizes, the thresholds can still carry over from picture to picture, but with additional encoding rules in place to select which threshold should apply when multiple thresholds may be available due to a block size change. For example, the most conservative thresholds can be selected (the thresholds least likely to result in skip mode encoding); or, conversely, the least conservative thresholds can be applied (the thresholds most likely to result in skip mode encoding).

Embodiments of the disclosed techniques have particular application to scenarios in which efficient, fast encoding is desirable, such as real-time encoding situations (e.g., encoding of live events, video conferencing applications, and the like). Thus, the disclosed techniques can be performed when an encoder is operating in a low-latency and/or fast encoding mode (e.g., for real-time (or substantially real-time) encoding, such as during the encoding of live events or video conferencing).

Figure 8:
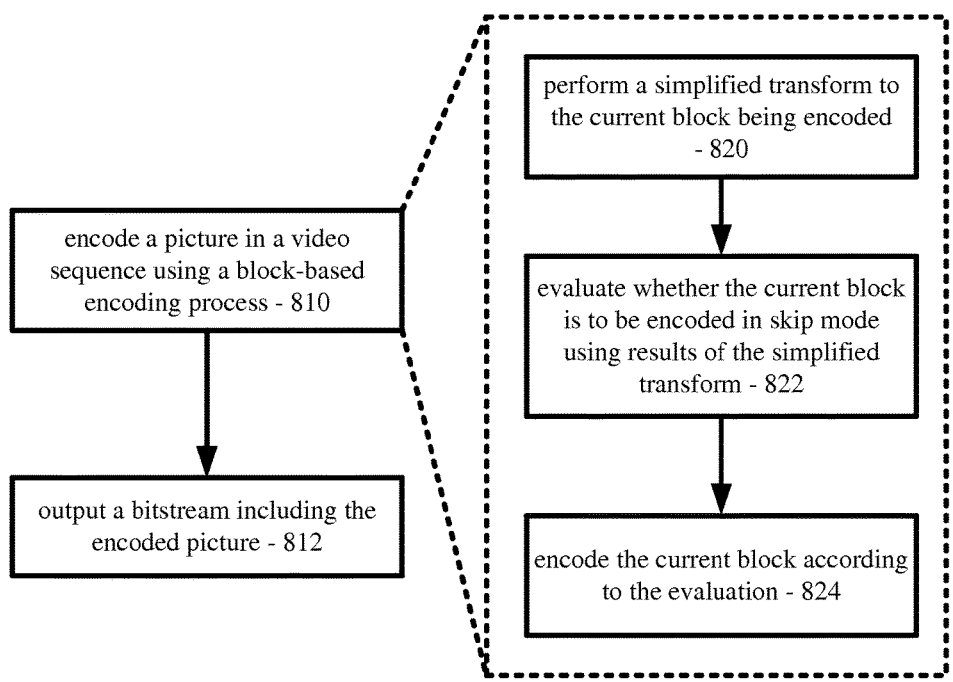
FIG. 8 is a flow chart illustrating another exemplary embodiment for performing encoding using aspects of the disclosed technology.

FIG. 8 is a flow chart (800) illustrating an exemplary embodiment for selectively encoding a picture portion (e.g., a block) of a video sequence using aspects of the technology introduced above with respect to FIGS. 5 and 6. For instance, the illustrated embodiment can be used to encode a coding unit in "skip" mode according to the H.265/HEVC standard. The disclosed embodiment can be performed by a computing device implementing a video encoder, which may be further configured to produce a bitstream compliant with a particular standard (e.g., the H.265/HEVC standard). The particular embodiment shown in FIG. 8 should not be construed as limiting, as the disclosed method acts can be performed alone, in different orders, or at least partially simultaneously with one another. Further, any of the disclosed methods or method acts can be performed with any other methods or method acts disclosed herein.

At (810), a picture in a video sequence is encoded using a block-based encoding process in which a core transform is selectively applied to one or more blocks of the picture. And, at (812), a bitstream including the encoded picture is output.

In the illustrated embodiment, the encoding of the picture in the video sequence comprises, for a current block (e.g., luma coding block) of the picture being encoded: performing (820) a simplified transform to the current block of the picture, the simplified transform including fewer computations than the core transform; evaluating (822) whether the current block is to be encoded in a skip mode using results of the simplified transform; and encoding (824) the current block according to the evaluation. In particular implementations, the simplified transform is a Hadamard transform.

In certain implementations, the evaluating whether the current block is to be encoded in the skip mode using results of the simplified transform is performed by: evaluating a largest transformed coefficient in the current block relative to a threshold value, and determining that the current block is to be encoded in the skip mode if the largest transformed coefficient in the current block satisfies (e.g., exceeds) the threshold value. In other implementations, the evaluating whether the current block is to be encoded in the skip mode using results of the simplified transform is performed by: quantizing the transformed coefficients in the current block using a quantization level based on the quantization parameter, and determining that the current block is to be encoded in the skip mode if no quantized transformed coefficients in the current block are greater than zero.

In some implementations, the results of the simplified transform are also used to determine transform size. For instance, the video encoder can be further configured to determine a transform size to apply to the current block also using results of the simplified transform These example embodiments can be performed as part of an encoding mode (e.g., a low-latency and/or fast encoding mode) in which computational efficiency and encoder speed are desirably increased (potentially at the cost of some increased distortion or quality loss). For example, in some instances, the embodiments are performed as part of a real-time or substantially real-time encoding operation. For instance, the embodiments can be implemented as part of a video conferencing system or system configured to encode live events.

Further, any of the aspects of the disclosed technology disclosed with respect to FIG. 8 can be used with other embodiments disclosed herein. For instance, any aspect of the embodiments disclosed with respect to FIGS. 5, 6, 8, 9, and 10 can be used in combination with one another.

Figure 9:
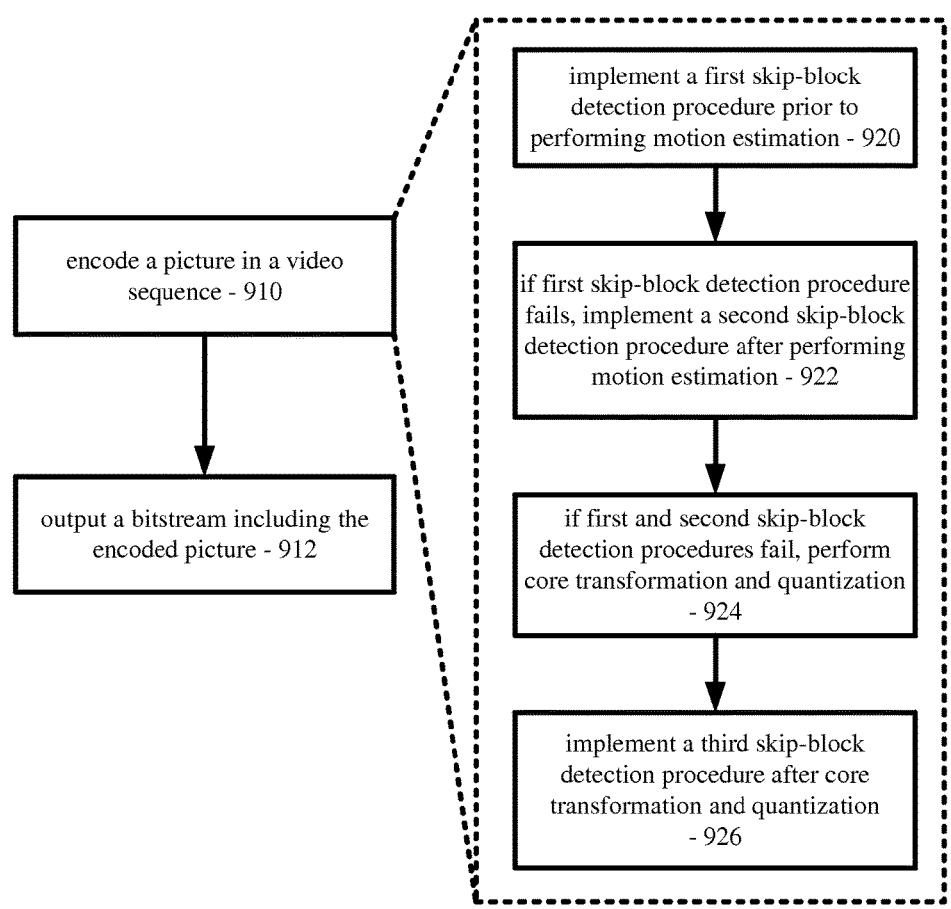
FIG. 9 is a flow chart illustrating a further exemplary embodiment for performing encoding using aspects of the disclosed technology.

FIG. 9 is another flow chart (900) illustrating another example embodiment for encoding a picture of a video sequence according to an embodiment of the disclosed technology. The example embodiment of FIG. 9 uses aspects of the technology introduced above with respect to FIGS. 5 and 6. The disclosed embodiment can be performed by a computing device implementing a video encoder, which may be further configured to produce a bitstream compliant with the H.265/HEVC standard. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At (910), a picture in a video sequence is encoded. And, at (912), a bitstream comprising the encoded picture is output. In the illustrated embodiment, the picture is formed from blocks, and the encoding includes encoding a respective block (e.g., a luma coding block) of the picture by applying a series of skip-block detection procedures during the encoding of the respective block.

In the illustrated embodiment, the series of skip block detection procedures comprises: a first skip-block detection procedure (920) implemented prior to performing any motion estimation for the respective block; and a second skip-block detection procedure (922) implemented after performing motion estimation for the respective block and if the first skip block detection procedure fails to detect that the respective block is to be encoded as a skip block in a skip mode.

In particular implementations, both the first skip-block detection procedure and the second skip-block detection procedure are implemented prior to applying a core transform (e.g., a discrete cosine transform (DCT) or approximation thereof) to values of the block and also prior to quantizing transform coefficients of the block resulting from the core transform (both shown at (926)). For example, the first and second skip-block detection procedures can be implemented prior to the core transform of the particular video codec standard in which the method is being implemented (e.g., the H.265/HEVC standard).

In particular implementations, the encoding of the respective block further comprises implementing a transform-size detection procedure for determining a size of a core transform to be applied to the respective block, and the second skip-block detection procedure is combined with the transform-size detection procedure. In one example implementation, for instance, the second skip-block detection procedure comprises: applying a Hadamard transform to values of the respective block; and determining whether the respective block is a skip block to be encoded in skip mode based on transformed coefficients resulting from the Hadamard transform. Further, a size of a core transform to be applied to the respective block can be based at least in part on the transformed coefficients resulting from the Hadamard transform.

In further implementations, if both the first skip-block detection procedure and the second skip-block detection procedure fail to detect that the respective block is to be encoded in a skip mode, a core transformation is performed to values of the respective block and the transformed coefficients resulting from the core transformation are quantized (shown together at (926)). A third skip-block detection procedure (928) can be performed based on the quantized transform coefficients.

These example embodiments can be performed as part of an encoding mode (e.g., a low-latency or fast encoding mode) in which computational efficiency and encoder speed are desirably increased (potentially at the cost of some increased distortion or quality loss). For example, in some instances, the embodiments are performed as part of a real-time or substantially real-time encoding operation. For instance, the embodiments can be implemented as part of a video conferencing system.

Further, any of the aspects of the disclosed technology disclosed with respect to FIG. 9 can be used with other embodiments disclosed herein. For instance, any aspect of the embodiments disclosed with respect to FIGS. 5, 6, 8, 9, and 10 can be used in combination with one another.

Figure 10:
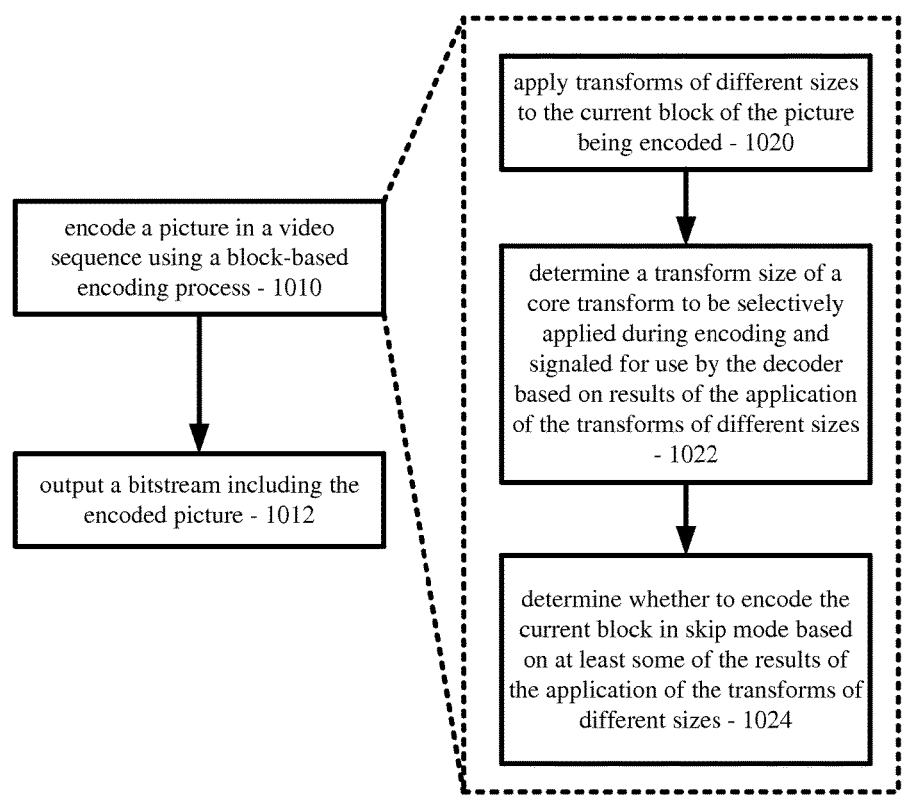
FIG. 10 is a flow chart illustrating yet another exemplary embodiment for performing encoding using aspects of the disclosed technology.

FIG. 10 is another flow chart (1000) illustrating another example embodiment for encoding a picture of a video sequence according to an embodiment of the disclosed technology. The example embodiment of FIG. 10 uses aspects of the technology introduced above with respect to FIGS. 5 and 6. The disclosed embodiment can be performed by a computing device implementing a video encoder, which may be further configured to produce a bitstream compliant with the H.265/HEVC standard. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At (1010), a picture in a video sequence is encoded using a block-based encoding process in which a core transform is applied to one or more blocks of the picture. And, at (1012), a bitstream including the encoded picture is output.

In particular implementations, the encoding of the picture in the video sequence comprises, for a current block (e.g., a current luma coding block) of the picture being encoded: applying (1020) transforms of different sizes to the current block; determining (1022) a transform size to be selectively applied during encoding and signaled for use by the decoder based on results of the application of the transforms of different sizes; and determining (1024) whether to encode the current block in a skip mode based on at least some of the results of the application of the transforms of different sizes.

In some implementations, the transforms of different sizes that are applied are simplified transforms relative to the core transform (e.g., Hadamard transforms). For instance, the simplified transforms can be transforms that are computationally less intensive and/or faster to implement than the core transform implemented by the encoder (e.g., the core transform specified by the H.265/HEVC standard). In certain implementations, the act of determining whether to encode the current block in a skip mode based on at least some of the results of the application of the transforms of different sizes comprises: determining whether any of the transformed coefficients from a selected one of the applied transforms of different sizes is larger than a threshold value; and encoding the current block in a non-skip mode if the selected one of the applied transforms of different sizes is larger than the threshold value. In other implementations, the act of determining whether to encode the current block in skip mode based on at least some of the results of the application of the transforms of different sizes comprises: quantizing the transformed coefficients from a selected one of the applied transforms; and encoding the current block in a non-skip mode if any of the quantized transformed coefficients from the selected one of the applied transforms is greater than zero.

These example embodiments can be performed as part of an encoding mode (e.g., a low-latency and/or fast encoding mode) in which computational efficiency and encoder speed are desirably increased (potentially at the cost of some increased distortion or quality loss). For example, in some instances, the embodiments are performed as part of a real-time or substantially real-time encoding operation. For instance, the embodiments can be implemented as part of a video conferencing system.

Further, any of the aspects of the disclosed technology disclosed with respect to FIG. 10 can be used with other embodiments disclosed herein. For instance, any aspect of the embodiments disclosed with respect to FIGS. 5, 6, 8, 9, and 10 can be used in combination with one another.

VI. Concluding Remarks

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims and their equivalents.

We claim:

1. A video encoder system, comprising:
 a buffer configured to store pictures of a video sequence to be encoded; and
 a video encoder configured to encode the pictures of the video sequence by:
  encoding a picture in a video sequence using a block-based encoding process in which a core transform is selectively applied to one or more blocks of the picture; and
  outputting a bitstream including the encoded picture,
 wherein the encoding of the picture in the video sequence comprises, for a current block of the picture being encoded:

performing simplified transforms of different sizes to the current block of the picture, the simplified transforms including fewer computations than the core transform;

evaluating whether the current block is to be encoded in a skip mode using results of the performed simplified transforms that include fewer computations than the core transform; and encoding the current block according to the evaluation.

2. The video encoder system of claim 1, wherein the evaluating whether the current block is to be encoded in the skip mode using results of the performed simplified transforms is performed by:

evaluating a largest transformed coefficient in the current block relative to a threshold value; and determining that the current block is to be encoded in the skip mode if the largest transformed coefficient in the current block satisfies the threshold value.

3. The video encoder system of claim 1, wherein the evaluating whether the current block is to be encoded in the skip mode using results of the performed simplified transforms is performed by:

quantizing the transformed coefficients in the current block using a quantization level based on a quantization parameter for the video encoder system; and determining that the current block is to be encoded in the skip mode if no quantized transformed coefficients in the current block are greater than zero.

4. The video encoder system of claim 1, wherein the simplified transforms are Hadamard transforms.

5. The video encoder system of claim 1, wherein the video encoder is further configured to determine a transform size to apply to the current block also using results of the performed simplified transforms.

6. The video encoder system of claim 1, wherein the video encoder system performs the encoding in real-time or substantially real-time.

7. The video encoder system of claim 1, wherein the video encoder system is part of a video conferencing system.

8. The video encoder system of claim 1, wherein the video encoder is further configured to output a bitstream with the encoded current picture.

9. One or more computer-readable memory or storage devices storing computer-executable instructions which when executed by a computing device causes the computing device to perform encoding operations comprising:

encoding a picture in a video sequence, the picture being formed from blocks, the encoding including encoding of a respective block of the picture by applying a series of skip-block detection procedures during the encoding of the respective block, wherein the series of skip-block detection procedures comprises:

a first skip-block detection procedure implemented prior to performing any motion estimation for the respective block; and a second skip-block detection procedure implemented after performing motion estimation for the respective block and if the first skip-block detection procedure fails to detect that the respective block is to be encoded in skip mode, wherein both the first skip-block detection procedure and the second skip-block detection procedure are implemented prior to applying a core transform to values of the block and prior to quantizing transform coefficients of the block resulting from the core transform.

10. The one or more computer-readable memory or storage devices of claim 9, wherein the encoding of the respective block further comprises implementing a transform-size detection procedure for determining a size of a core transform to be applied to the respective block, and wherein the second skip-block detection procedure is combined with the transform-size detection procedure.

11. The one or more computer-readable memory or storage devices of claim 9, wherein the second skip-block detection procedure comprises:

applying a Hadamard transform to values of the respective block; and determining whether the respective block is to be encoded in the skip mode based on transformed coefficients resulting from the Hadamard transform.

12. The one or more computer-readable memory or storage devices of claim 9, wherein the encoding of the respective block further comprises determining a size of a core transform to be applied to the respective block based at least in part on the transformed coefficients resulting from the Hadamard transform.

13. The one or more computer-readable memory or storage devices of claim 9, wherein the encoding of the respective block further comprises, if both the first skip-block detection procedure and the second skip-block detection procedure fail to detect that the respective block is to be encoded in the skip mode:

performing a core transformation to values of the respective block; and quantizing transformed coefficients resulting from the core transformation.

14. The one or more computer-readable memory or storage devices of claim 13, wherein the encoding of the respective block further comprises, performing a third skip-block detection procedure based on the quantized transform coefficients.

15. The one or more computer-readable memory or storage devices of claim 9, wherein the encoding is performed in real-time or substantially real-time.

16. A method comprising:

by a computing device implementing a video encoder:

encoding a picture in a video sequence using a block-based encoding process in which a core transform is applied to one or more blocks of the picture; and outputting a bitstream including the encoded picture, wherein the encoding of the picture in the video sequence comprises, for a current block of the picture being encoded:

applying transforms of different sizes to the current block;

determining a transform size of a core transform to be selectively applied during encoding and signaled for use by the decoder based on results of the application of the transforms of different sizes; and determining whether to encode the current block in a skip mode based on at least some of the results of the application of the transforms of different sizes.

17. The method of claim 16, wherein the transforms of different sizes that are applied are simplified transforms relative to the core transform.

18. The method of claim 16, wherein the determining whether to encode the current block in the skip mode based on at least some of the results of the application of the transforms of different sizes comprises:

determining whether any of the transformed coefficients from a selected one of the applied transforms of different sizes is larger than a threshold value; and encoding the current block in a non-skip mode if the selected one of the applied transforms of different sizes is larger than the threshold value.

19. The method of claim 16, wherein the determining whether to encode the current block in the skip mode based on at least some of the results of the application of the transforms of different sizes comprises:

quantizing the transformed coefficients from a selected one of the applied transforms; and encoding the current block in a non-skip mode if any of the quantized transformed coefficients from the selected one of the applied transforms is greater than zero.

* * * * *